(12) United States Patent
Wu et al.

(10) Patent No.: US 12,745,277 B2
(45) Date of Patent: Sep. 22, 2026

(54) TECHNIQUES FOR FULL-DUPLEX OPERATION ON SIDELINK AND DOWNLINK IN WIRELESS COMMUNICATIONS SYSTEMS

(71) Applicant: QUALCOMM Incorporated, San Diego, CA (US)

(72) Inventors: Shuanshuan Wu, San Diego, CA (US); Kapil Gulati, Belle Mead, NJ (US); Junyi Li, Fairless Hills, PA (US); Navid Abedini, Basking Ridge, NJ (US); Anantharaman Balasubramanian, San Diego, CA (US); Sourjya Dutta, San Diego, CA (US); Hui Guo, Beijing (CN)

( * ) Notice: Subject to any disclaimer, the term of this patent is extended or adjusted under 35 U.S.C. 154(b) by 260 days.

(21) Appl. No.: 18/264,393

(22) PCT Filed: Mar. 23, 2021

(86) PCT No.: PCT/CN2021/082259

§ 371 (c)(1),
(2) Date: Aug. 4, 2023

(87) PCT Pub. No.: WO2022/198428

PCT Pub. Date: Sep. 29, 2022

(65) Prior Publication Data

US 2024/0107603 A1 Mar. 28, 2024

(51) Int. Cl.
*H04W 72/541* (2023.01)
*H04B 17/336* (2015.01)
(Continued)

(52) U.S. Cl.
CPC ........ *H04W 72/541* (2023.01); *H04B 17/336* (2015.01); *H04W 16/28* (2013.01);
(Continued)

(58) Field of Classification Search
None
See application file for complete search history.

(56) References Cited

U.S. PATENT DOCUMENTS 10,716,134 B2 7/2020 Gulati et al.
12,418,908 B2 * 9/2025 Wang .................. H04W 72/121
(Continued)

FOREIGN PATENT DOCUMENTS

CN 111727648 A 9/2020
WO WO-2018030185 A1 2/2018
(Continued)

OTHER PUBLICATIONS

Huawei, et al., “Overview of Rel-17 Work Areas for NR and LTE”, 3GPP TSG RAN Meeting #84, RP-191486, Final (WAS RP-191007), 3rd Generation Partnership Project, Mobile Competence Centre, 650, Route Des Lucioles, F-06921, Sophia-Antipolis, vol. TSG RAN, No. Newport Beach, USA, Jun. 3, 2019-Jun. 6, 2019, Jun. 4, 2019, 22 Pages, May 29, 2019, XP051748412.
(Continued)

*Primary Examiner* — Xavier S Wong

(57) ABSTRACT

Methods, systems, and devices for wireless communications are described. Generally, the described techniques provide for a first user equipment (UE) to establish a communication link with a base station and a sidelink communication link with a second UE using different transmission reception points associated with the first UE. The first UE may perform an interference measurement between downlink communications received on the communication link and sidelink communications transmitted on the sidelink communication link. The first UE may determine whether it is
(Continued)

able to perform full-duplex operations on the communication link and the sidelink communication link based on the interference measurement and may transmit an indication of the capability of the first UE to the base station. In some examples, the second UE may perform measurements of interference from downlink signals on the sidelink communication link, where the measurements may inform the determination to use full-duplex communications at the first UE.

24 Claims, 15 Drawing Sheets

(51) Int. Cl.

*H04W 16/28* (2009.01)
*H04W 72/232* (2023.01)
*H04W 76/15* (2018.01)
*H04W 92/18* (2009.01)

(52) U.S. Cl.

CPC ......... *H04W 72/232* (2023.01); *H04W 76/15* (2018.02); *H04W 92/18* (2013.01)

(56) References Cited

U.S. PATENT DOCUMENTS

| | | | | |
|---|---|---|---|---|
| 2020/0260463 | A1 | 8/2020 | Lovlekar et al. | |
| 2020/0396718 | A1 | 12/2020 | Luo et al. | |
| 2021/0258887 | A1* | 8/2021 | Osawa | H04W 52/242 |
| 2021/0329633 | A1* | 10/2021 | Xing | H04W 72/0446 |
| 2022/0225468 | A1* | 7/2022 | Chae | H04L 5/0094 |
| 2022/0231890 | A1* | 7/2022 | Horn | H04L 25/03343 |
| 2022/0330038 | A1* | 10/2022 | Ganesan | H04W 8/005 |
| 2022/0394699 | A1* | 12/2022 | Lee | H04W 72/0453 |
| 2023/0132757 | A1 | 5/2023 | Kang | |

FOREIGN PATENT DOCUMENTS

| | | |
|---|---|---|
| WO | WO-2019160643 | 8/2019 |
| WO | WO-2019164363 A1 | 8/2019 |

OTHER PUBLICATIONS

International Search Report and Written Opinion—PCT/CN2021/082259—ISA/EPO—Dec. 8, 2021.

Supplementary European Search Report—EP21932060—Search Authority—The Hague—Dec. 4, 2024.

* cited by examiner

400

800

1000

1400

TECHNIQUES FOR FULL-DUPLEX OPERATION ON SIDELINK AND DOWNLINK IN WIRELESS COMMUNICATIONS SYSTEMS

CROSS REFERENCE

The present application is a 371 national stage filing of International PCT Application No. PCT/CN2021/082259 by W U et al. entitled "TECHNIQUES FOR FULL-DUPLEX OPERATION ON SIDELINK AND DOWNLINK IN WIRELESS COMMUNICATIONS SYSTEMS," filed Mar. 23, 2021, which is assigned to the assignee hereof, and which is expressly incorporated by reference in its entirety herein.

FIELD OF TECHNOLOGY

The following relates to wireless communications, including techniques for full-duplex operation on sidelink and downlink in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems, such as systems that support sidelink communications (which may be referred to as vehicle-to-vehicle (V2V) or vehicle-to-everything (V2X) communications), may support devices having multiple transmission reception points (TRPs). For example, a UE may include multiple TRPs, and the UE may be capable of operating in a full-duplex mode, where different TRPs may be used to simultaneously transmit or receive signals. However, in some cases, when concurrent downlink and sidelink transmissions are scheduled for a multi-TRP (mTRP) UE, the mTRP UE may have to drop one or more of the downlink transmission or the sidelink transmission.

SUMMARY

The described techniques relate to improved methods, systems, devices, and apparatuses that support techniques for full-duplex operation on sidelink and downlink in wireless communications systems. Generally, the described techniques provide for a first user equipment (UE) (e.g., a multi-transmission reception point (mTRP) UE) to establish a communication link (e.g., an access link) with a base station and a sidelink communication link with a second UE using different transmission reception points (TRPs) associated with the first UE. The first UE may perform an interference measurement between sidelink communications transmitted on the sidelink communication link and downlink communications received on the communication link. That is, the first UE may perform one or more self-interference measurements based on transmissions to a second UE on the sidelink that may interfere with signals received from the base station on the downlink. The first UE may determine whether it is capable to perform full-duplex operations on the communication link and the sidelink communication link based on the self-interference measurement(s), and the first UE may transmit a message to the base station indicating whether the first UE is able to perform the full-duplex operations.

In some examples, the second UE may also perform one or more measurements that inform whether the first UE may use full-duplex communications. In such cases, measurement results of the second UE may be used to determine whether full-duplex communications are scheduled (e.g., by the base station) for the first UE. For example, the second UE may measure interference on the sidelink communication link based on downlink transmissions from the base station to the first UE. In such cases, the second UE may perform the measurements on a directional beam (e.g., a receive beam) that the second UE intends to use (or is using) for sidelink communications with the first UE, which may be based on information provided by the first UE, by the base station, or both. In any case, the second UE may determine interference on the sidelink communication link based on transmission between the first UE and the base station (e.g., based on synchronization signal blocks or other signals from the base station). The second UE may accordingly report the measurement results (e.g., directly to the base station or via the first UE).

Based on the indication of the first UE's capability to communicate using the full-duplex communications, the self-interference measurement results of the first UE, the measurement results of the second UE, or any combination thereof, the base station may determine whether full-duplex communications (e.g., on the sidelink and the access link) may be scheduled. If the base station determines that the full-duplex communications are to be performed, the base station may schedule resources (e.g., via downlink and sidelink resource grants) to the first UE, and the first UE may communicate with both the base station and the second UE using full-duplex communications (e.g., simultaneously communicating with the different devices using respective TRPs).

A method for wireless communications at a UE is described. The method may include establishing a first communication link with a base station and a sidelink communication link with a second UE, performing an interference measurement for sidelink communications transmitted on the sidelink communication link and downlink communications received on the first communication link, where the interference measurement is based on a first configuration for downlink reception on the first communication link and a second configuration for sidelink transmission on the sidelink communication link, and transmitting, to the base station, a message indicating whether the first UE is capable of concurrently receiving downlink communications on the first communication link and transmitting sidelink communications on the sidelink communication link based on the interference measurement.

An apparatus for wireless communications at a first UE is described. The apparatus may include a processor, memory coupled with the processor, and instructions stored in the memory. The instructions may be executable by the processor to cause the apparatus to establish a first communication link with a base station and a sidelink communication link with a second UE, perform an interference measurement for sidelink communications transmitted on the sidelink communication link and downlink communications received on the first communication link, where the interference measurement is based on a first configuration for downlink reception on the first communication link and a second configuration for sidelink transmission on the sidelink communication link, and transmit, to the base station, a message indicating whether the first UE is capable of concurrently receiving downlink communications on the first communication link and transmitting sidelink communications on the sidelink communication link based on the interference measurement.

Another apparatus for wireless communications at a first UE is described. The apparatus may include means for establishing a first communication link with a base station and a sidelink communication link with a second UE, means for performing an interference measurement for sidelink communications transmitted on the sidelink communication link and downlink communications received on the first communication link, where the interference measurement is based on a first configuration for downlink reception on the first communication link and a second configuration for sidelink transmission on the sidelink communication link, and means for transmitting, to the base station, a message indicating whether the first UE is capable of concurrently receiving downlink communications on the first communication link and transmitting sidelink communications on the sidelink communication link based on the interference measurement.

A non-transitory computer-readable medium storing code for wireless communications at a first UE is described. The code may include instructions executable by a processor to establish a first communication link with a base station and a sidelink communication link with a second UE, perform an interference measurement for sidelink communications transmitted on the sidelink communication link and downlink communications received on the first communication link, where the interference measurement is based on a first configuration for downlink reception on the first communication link and a second configuration for sidelink transmission on the sidelink communication link, and transmit, to the base station, a message indicating whether the first UE is capable of concurrently receiving downlink communications on the first communication link and transmitting sidelink communications on the sidelink communication link based on the interference measurement.

Some examples of the method, apparatuses, and non-transitory computer-readable medium described herein may further include operations, features, means, or instructions for determining that the first UE may be capable of concurrently receiving the downlink communications on the first communication link and transmitting the sidelink communications on the sidelink communication link based on determining that the interference measurement satisfies a threshold, where transmitting the message may be based on the determination and receiving, from the base station, a resource grant indicating a first set of resources and a second set of resources, where the first set of resources and the second set of resources may be configured for concurrently receiving a downlink message from the base station on the first communication link and transmitting a sidelink message to the second UE on the sidelink communication link, the first set of resources at least partially overlapping with the second set of resources.

In some examples of the method, apparatuses, and non-transitory computer-readable medium described herein, the resource grant includes a downlink transmission configuration indicator state the first UE may be to use for concurrently monitoring a downlink control channel while transmitting the sidelink message on the sidelink communication link and receiving the downlink message may be based on monitoring the downlink control channel.

Some examples of the method, apparatuses, and non-transitory computer-readable medium described herein may further include operations, features, means, or instructions for determining that the first UE may be incapable of concurrently receiving downlink communications on the first communication link and transmitting sidelink communications on the sidelink communication link based on determining that the interference measurement fails to satisfy a threshold, where transmitting the message may be based on the determination.

Some examples of the method, apparatuses, and non-transitory computer-readable medium described herein may further include operations, features, means, or instructions for transmitting, to the second UE, an interference measurement configuration for the second UE to perform one or more interference measurements between downlink communications from the base station to the first UE and sidelink communications from the first UE to the second UE and receiving, from the second UE, an interference measurement report including a result of the one or more interference measurements.

In some examples of the method, apparatuses, and non-transitory computer-readable medium described herein, the interference measurement configuration includes one or more downlink beam directions associated with the downlink communications on the first communication link, one or more beam indices associated with one or more reference signals that may be quasi co-located with the one or more downlink beam directions, one or more downlink transmission configuration indicator states indicating the one or more downlink beam directions, or any combination thereof.

In some examples of the method, apparatuses, and non-transitory computer-readable medium described herein, receiving the interference measurement report including the result of the one or more interference measurements may include operations, features, means, or instructions for receiving an indication that the second UE may be capable of concurrently receiving sidelink communications from the first UE while the first UE receives downlink communications from the base station based on the result of the one or more interference measurements.

Some examples of the method, apparatuses, and non-transitory computer-readable medium described herein may further include operations, features, means, or instructions for determining a transmission power for transmitting the sidelink communications on the sidelink communication link based on the result of the one or more interference measurements from the second UE and transmitting sidelink communications on the sidelink communication link based on the transmission power.

Some examples of the method, apparatuses, and non-transitory computer-readable medium described herein may further include operations, features, means, or instructions for receiving, from the base station, an indication of a first transmission power for the sidelink communications on the sidelink communication link, where the transmission power may be based on an adjustment of the first transmission power and the result of the one or more interference measurements.

In some examples of the method, apparatuses, and non-transitory computer-readable medium described herein, the message further includes an indication of one or more of a destination identification associated with the second UE, one or more sidelink beam directions associated with the sidelink communications, or one or more beam directions the first UE may be capable of using for concurrently receiving the downlink communications and transmitting the sidelink communications.

Some examples of the method, apparatuses, and non-transitory computer-readable medium described herein may further include operations, features, means, or instructions for receiving, from the base station, one or more transmission power control commands associated with a transmission power the first UE may be to use to transmit sidelink communications on the sidelink communication link and transmitting sidelink communications on the sidelink communication link based on receiving the one or more transmission power control commands.

In some examples of the method, apparatuses, and non-transitory computer-readable medium described herein, the first communication link may be associated with a first TRP of a set of TRPs at the first UE and the sidelink communication link may be associated with a second TRP of the set of TRPs at the first UE.

A method for wireless communications at a first UE is described. The method may include establishing a sidelink communication link with a second UE, receiving a message indicating an interference measurement configuration for the first UE to perform one or more interference measurements for downlink communications from a base station to the second UE and sidelink communications from the second UE, and transmitting an interference measurement report including a result of the one or more interference measurements performed based on the interference measurement configuration.

An apparatus for wireless communications at a first UE is described. The apparatus may include a processor, memory coupled with the processor, and instructions stored in the memory. The instructions may be executable by the processor to cause the apparatus to establish a sidelink communication link with a second UE, receive a message indicating an interference measurement configuration for the first UE to perform one or more interference measurements for downlink communications from a base station to the second UE and sidelink communications from the second UE, and transmit an interference measurement report including a result of the one or more interference measurements performed based on the interference measurement configuration.

Another apparatus for wireless communications at a first UE is described. The apparatus may include means for establishing a sidelink communication link with a second UE, means for receiving a message indicating an interference measurement configuration for the first UE to perform one or more interference measurements for downlink communications from a base station to the second UE and sidelink communications from the second UE, and means for transmitting an interference measurement report including a result of the one or more interference measurements performed based on the interference measurement configuration.

A non-transitory computer-readable medium storing code for wireless communications at a first UE is described. The code may include instructions executable by a processor to establish a sidelink communication link with a second UE, receive a message indicating an interference measurement configuration for the first UE to perform one or more interference measurements for downlink communications from a base station to the second UE and sidelink communications from the second UE, and transmit an interference measurement report including a result of the one or more interference measurements performed based on the interference measurement configuration.

In some examples of the method, apparatuses, and non-transitory computer-readable medium described herein, receiving the interference measurement configuration may include operations, features, means, or instructions for receiving the interference measurement configuration from the second UE, where the interference measurement report including the result of the one or more interference measurements may be transmitted to the second UE.

In some examples of the method, apparatuses, and non-transitory computer-readable medium described herein, the interference measurement configuration includes one or more downlink beam directions associated with the downlink communications on a first communication link, one or more beam indices associated with one or more reference signals that may be quasi co-located with the one or more downlink beam directions, one or more downlink transmission configuration indicator states indicating the one or more downlink beam directions, or any combination thereof.

Some examples of the method, apparatuses, and non-transitory computer-readable medium described herein may further include operations, features, means, or instructions for performing the one or more interference measurements based on the interference measurement configuration, the one or more interference measurements including measurements of one or more reference signals using a beam direction associated with the sidelink communication link on which the first UE may be to receive sidelink communications from the second UE.

Some examples of the method, apparatuses, and non-transitory computer-readable medium described herein may further include operations, features, means, or instructions for determining one or more of a reference signal received power, a signal-to-interference-plus-noise ratio, or a received signal strength indicator associated with the one or more reference signals.

Some examples of the method, apparatuses, and non-transitory computer-readable medium described herein may further include operations, features, means, or instructions for determining that the one or more interference measurements satisfy a threshold and transmitting, to the second UE, an indication that the second UE may be capable of concurrently receiving sidelink communications from the first UE while the first UE receives downlink communications from the base station based on the result of the one or more interference measurements, where transmitting the indication may be based on the one or more interference measurements satisfying the threshold.

In some examples of the method, apparatuses, and non-transitory computer-readable medium described herein, receiving the interference measurement configuration may include operations, features, means, or instructions for establishing a first communication link with a first base station and receiving the interference measurement configuration from the first base station, where the interference measurement report including the result of the one or more interference measurements may be transmitted to the first base station.

In some examples of the method, apparatuses, and non-transitory computer-readable medium described herein, the interference measurement configuration includes one or more of a downlink channel state information reference signal configuration, indices associated with one or more synchronization signal blocks, a source identification associated with the second UE, or one or more sidelink transmission configuration indicator states associated with the sidelink communication link with the second UE.

In some examples of the method, apparatuses, and non-transitory computer-readable medium described herein, the interference measurement configuration indicates that the first UE perform the one or more interference measurements using a spatial configuration quasi co-located with one or more beam directions on which the first UE may be to receive sidelink communications from the second UE.

A method for wireless communications at a base station is described. The method may include establishing a first communication link with a first UE, determining that the first UE is capable of concurrently receiving downlink communications on the first communication link and transmitting sidelink communications on a sidelink communication link between the first UE and a second UE, and transmitting a resource grant indicating a first set of resources and a second set of resources based on the determination, where the first set of resources and the second set of resources are configured for concurrently receiving a downlink message from the base station on the first communication link and transmitting a sidelink message from the first UE to the second UE on the sidelink communication link, the first set of resources at least partially overlapping with the second set of resources.

An apparatus for wireless communications at a base station is described. The apparatus may include a processor, memory coupled with the processor, and instructions stored in the memory. The instructions may be executable by the processor to cause the apparatus to establish a first communication link with a first UE, determine that the first UE is capable of concurrently receiving downlink communications on the first communication link and transmitting sidelink communications on a sidelink communication link between the first UE and a second UE, and transmit a resource grant indicating a first set of resources and a second set of resources based on the determination, where the first set of resources and the second set of resources are configured for concurrently receiving a downlink message from the base station on the first communication link and transmitting a sidelink message from the first UE to the second UE on the sidelink communication link, the first set of resources at least partially overlapping with the second set of resources.

Another apparatus for wireless communications at a base station is described. The apparatus may include means for establishing a first communication link with a first UE, means for determining that the first UE is capable of concurrently receiving downlink communications on the first communication link and transmitting sidelink communications on a sidelink communication link between the first UE and a second UE, and means for transmitting a resource grant indicating a first set of resources and a second set of resources based on the determination, where the first set of resources and the second set of resources are configured for concurrently receiving a downlink message from the base station on the first communication link and transmitting a sidelink message from the first UE to the second UE on the sidelink communication link, the first set of resources at least partially overlapping with the second set of resources.

A non-transitory computer-readable medium storing code for wireless communications at a base station is described. The code may include instructions executable by a processor to establish a first communication link with a first UE, determine that the first UE is capable of concurrently receiving downlink communications on the first communication link and transmitting sidelink communications on a sidelink communication link between the first UE and a second UE, and transmit a resource grant indicating a first set of resources and a second set of resources based on the determination, where the first set of resources and the second set of resources are configured for concurrently receiving a downlink message from the base station on the first communication link and transmitting a sidelink message from the first UE to the second UE on the sidelink communication link, the first set of resources at least partially overlapping with the second set of resources.

In some examples of the method, apparatuses, and non-transitory computer-readable medium described herein, determining that the first UE may be capable of concurrently receiving the downlink communications on the first communication link and transmitting the sidelink communications on the sidelink communication link may include operations, features, means, or instructions for receiving, from the first UE, a message indicating a capability of the first UE to concurrently receiving the downlink communications on the first communication link and transmitting the sidelink communications on the sidelink communication link, the capability being based on an interference measurement for sidelink communications transmitted on the sidelink communication link and downlink communications received on the first communication link, where the determination may be based on the indication of the capability.

In some examples of the method, apparatuses, and non-transitory computer-readable medium described herein, the message further includes an indication of one or more of a destination identification associated with the second UE, one or more sidelink beam directions the first UE may be to use for transmission sidelink communications to the second UE, or one or more beam directions on which the first UE may be capable to receive downlink communications from the base station and concurrently transmit sidelink communications to the second UE.

Some examples of the method, apparatuses, and non-transitory computer-readable medium described herein may further include operations, features, means, or instructions for establishing a second communication link with the second UE, transmitting, to the second UE, an interference measurement configuration for the second UE to perform one or more interference measurements for downlink communications from the base station to the first UE and sidelink communications to the second UE from the first UE, and receiving, from the second UE, an interference measurement report including a result of the one or more interference measurements, where determining that the first UE may be capable of concurrently receiving the downlink communications on the first communication link and transmitting the sidelink communications on the sidelink communication link may be based on receiving the result of the one or more interference measurements.

In some examples of the method, apparatuses, and non-transitory computer-readable medium described herein, the interference measurement configuration includes one or more of a downlink channel state information reference signal configuration, indices associated with one or more synchronization signal blocks, a source identification associated with the first UE, or one or more sidelink transmission configuration indicator states associated with the sidelink communication link.

In some examples of the method, apparatuses, and non-transitory computer-readable medium described herein, the interference measurement configuration indicates the second UE to perform the one or more interference measurements using a spatial configuration quasi co-located with one or more beam directions on which the second UE may be to receive sidelink communications from the first UE.

Some examples of the method, apparatuses, and non-transitory computer-readable medium described herein may further include operations, features, means, or instructions for receiving, from a second base station, a message indicating a result of a one or more interference measurements performed by the second UE, determining that the first UE may be capable of concurrently receiving the downlink communications on the first communication link and transmitting the sidelink communications on the sidelink communication link may be based on receiving the result from the second base station.

Some examples of the method, apparatuses, and non-transitory computer-readable medium described herein may further include operations, features, means, or instructions for determining a transmission power for the first UE to transmit the sidelink communications on the sidelink communication link based on determining that the first UE may be capable of concurrently receiving the downlink communications on the first communication link and transmitting the sidelink communications on the sidelink communication link and transmitting, to the first UE, one or more transmission power control commands associated with the determined transmission power.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
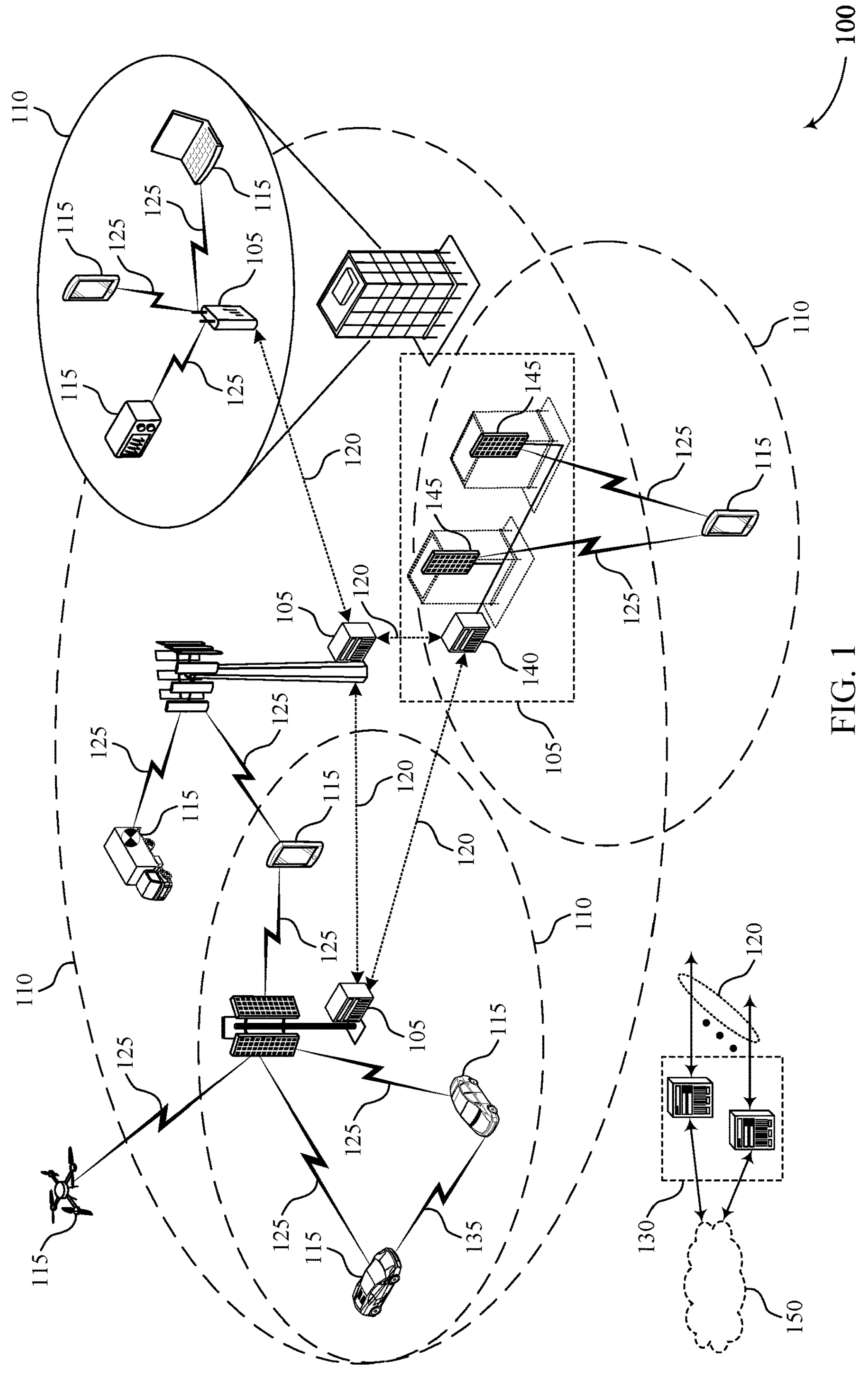
FIGS. 1 and 2 illustrate examples of wireless communications systems that supports techniques for full-duplex operation on sidelink and downlink in wireless communications systems in accordance with aspects of the present disclosure.

Some wireless communication systems, such as fifth generation (5G) New Radio (NR) systems, support wireless devices establishing both an access link (e.g., a Uu interface) and a sidelink (e.g., a PC5 interface). For example, a user equipment (UE) may establish an access link with a base station and a sidelink (e.g., a sidelink communication link) with another UE. In some cases, a UE may establish an access link with a base station and may establish a sidelink with another UE which operates as a relay (e.g., which has an access link with the same or different base station as the UE) such that the UE may communicate with a network via either the access link, or the sidelink, or both. In some cases, devices may use a sidelink to extend a coverage area. For example, a UE may establish a sidelink with another UE (e.g., a relay UE) having an access link with a base station for which the UE is out of coverage. Sidelink communications may be referred to as vehicle-to-vehicle (V2V) communications, vehicle-to-everything (V2X) communications, device-to-device (D2D) communications, or other terminology. In some examples, the UE may allocate resources for sidelink communications via a resource grant from a base station or autonomously allocate resources for sidelink communications using a sidelink sensing procedure.

Some wireless communications systems, such as those supporting sidelink communications, may support devices having multiple transmission reception points (TRPs). For example, a UE may have multiple TRPs located at different parts of the UE such that the UE may use any or all TRPs to communicate with a device or with different devices. In some cases (e.g., if a UE is relatively large), the UE may support full-duplex operations (e.g., concurrent transmitting and receiving) with different devices using different TRPs (e.g., where the TRPs are separated by some distance on the UE). For example, a UE may concurrently communicate with a base station using one TRP and with another UE using a different TRP. In some cases, communications received from the base station may interfere with communications transmitted by the UE. Similarly, in some cases, the UE may experience self-interference such that communications performed using one TRP interferes with communications performed using another TRP. In some cases, interference may lead to inefficient communications, low throughput, and the like. Accordingly, it may be advantageous to implement a method whereby a UE may determine whether the UE is capable to perform full-duplex operations using different TRPs.

One such method may include a UE (e.g., a sidelink transmitting UE, a multi-TRP (mTRP) UE) establishing a communication link with a base station and establishing a sidelink communication link with another UE (e.g., a sidelink receiving UE) using different TRPs (e.g., a first TRP for an access link and a second, different TRP for the sidelink). The transmitting UE may determine a configuration (e.g., downlink or sidelink beam directions) for receiving downlink communications form the base station for transmitting sidelink communications to the receiving UE. Based on the configurations, the transmitting UE may perform an interference measurement (e.g., a self-interference measurement based on the TRP used for receiving downlink communications and the TRP used for transmitting sidelink communications). The transmitting UE may determine (e.g., by comparing the interference measurement to a threshold) that the transmitting UE is capable to perform full-duplex operations on the communication link and the sidelink communication link. The transmitting UE may transmit a message indicating the capability of the transmitting UE to the base station. In some examples, the UE may transmit additional information (e.g., in a sidelink buffer status report) to the base station including downlink beam directions on which the transmitting UE is able to receive downlink communications concurrent to transmitting sidelink communications, sidelink beam directions on which the transmitting UE is to transmit sidelink communications, a destination identifier associated with the receiving UE, or any combination thereof. In response to receiving the message and any additional information, the base station may transmit a resource grant indicating overlapping sets of resources the UE is to use to concurrently receive downlink communications from the base station and transmit sidelink communications to the receiving UE (e.g., using full-duplex communications).

Additionally or alternatively, the receiving UE may perform an interference measurement between downlink communications from the base station and sidelink communications from the transmitting UE. In some examples, the receiving UE may receive, from the transmitting UE, an indication of a configuration for performing the interference measurement. For example, the receiving UE may receive an indication to perform interference measurement between synchronization signal blocks (SSBs) transmitted by the base station and sidelink communications received from the transmitting UE. In some examples, the receiving UE may establish a communication link with the base station and receive, from the base station, the configuration for performing the interference measurement. For example, the receiving UE may receive an indication of a downlink channel state information (CSI) reference signal (CSI-RS) configuration, one or more indices associated with SSBs, a source identifier associated with the transmitting UE, or a spatial configuration to use for performing the interference measurement. The receiving UE may perform the interference measurement and report the result to the transmitting UE or the base station. In some examples, the receiving UE may determine (e.g., by comparing the interference measurement to a threshold) that the receiving UE is capable of receiving sidelink communications concurrent to downlink transmissions by the base station and transmit an indication of the capability. Implementing aspects of the present disclosure may enable full-duplex operations on communication links and sidelinks which may reduce latency, increase efficiency, and increase throughput, among other benefits.

Aspects of the disclosure are initially described in the context of wireless communications systems. Aspects of the disclosure are further described in the context of a process flow which may be implemented by a wireless communications system. Aspects of the disclosure are further illustrated by and described with reference to apparatus diagrams, system diagrams, and flowcharts that relate to techniques for full-duplex operation on sidelink and downlink in wireless communications systems.

FIG. 1 illustrates an example of a wireless communications system 100 that supports techniques for full-duplex operation on sidelink and downlink in wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels.

In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS, which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time-division duplexing systems, may transmit an SSS but not a PSS. Both the PSS and the SSS may be located in the central 62 and 72 subcarriers of a carrier, respectively. In some cases, a base station 105 may transmit synchronization signals (e.g., PSS SSS, and the like) using multiple beams in a beam-sweeping manner through a cell coverage area. In some cases, PSS, SSS, or broadcast information (e.g., a physical broadcast channel (PBCH)) may be transmitted within different synchronization signal blocks (SSBs) on respective directional beams, where one or more SSBs may be included within an synchronization signal burst or synchronization signal burst set.

A quasi co-location (QCL) relationship between one or more transmissions or signals may refer to a relationship between the antenna ports (and the corresponding signaling beams) of the respective transmissions. For example, one or more antenna ports may be implemented by a base station 105 for transmitting at least one or more reference signals (such as a downlink reference signal, a synchronization signal block (SSB), or the like) and control information transmissions to a UE 115. However, the channel properties of signals sent via the different antenna ports may be interpreted (e.g., by a receiving device) to be the same (e.g., despite the signals being transmitted from different antenna ports), and the antenna ports (and the respective beams) may be described as being quasi co-located (QCLed). QCLed signals may enable the UE 115 to derive the properties of a first signal (e.g., delay spread, Doppler spread, frequency shift, average power, etc.) transmitted on a first antenna port from measurements made on a second signal transmitted via a second antenna port. Put another way, if two antenna ports are categorized as being QCLed in terms of, for example, delay spread then the UE 115 may determine the delay spread for one antenna port (e.g., based on a received reference signal, such as CSI-RS) and then apply the result to both antenna ports. Such techniques may avoid the UE 115 determining the delay spread separately for each antenna port. In some cases, two antenna ports may be said to be spatially QCLed, and the properties of a signal sent over a directional beam may be derived from the properties of a different signal over another, different directional beam. That is, QCL relationships may relate to beam information for respective directional beams used for communications of various signals.

Different types of QCL relationships may describe the relation between two different signals or antenna ports. For instance, QCL-TypeA may refer to a QCL relationship between signals including Doppler shift, Doppler spread, average delay, and delay spread. QCL-TypeB may refer to a QCL relationship including Doppler shift and Doppler spread, whereas QCL-TypeC may refer to a QCL relationship including Doppler shift and average delay. A QCL-TypeD may refer to a QCL relationship of spatial parameters, which may indicate a relation between two or more directional beams used to communicate signals. Here, the spatial parameters indicate that a first beam used to transmit a first signal may be similar (or the same) as another beam used to transmit a second, different, signal, or, that the same receive beam may be used to receive both the first and the second signal. Thus, the beam information for various beams may be derived through receiving signals from a transmitting device, where, in some cases, the QCL information or spatial information may help a receiving device efficient identify communications beams (e.g., without having to sweep through a large number of beams to identify the best beam (e.g., the beam having a highest signal quality)). In addition, QCL relationships may exist for both uplink and downlink transmissions and, in some cases, a QCL relationship may also be referred to as spatial relationship information.

In some examples, a transmission configuration indication (TCI) state configuration may include one or more parameters associated with a QCL relationship between transmitted signals. For example, a base station 105 may configure a QCL relationship that provides a mapping between a reference signal and antenna ports of another signal (e.g., a demodulation reference signal (DMRS) antenna port for PDCCH, a DMRS antenna port for PDSCH, a CSI-RS antenna port for CSI-RS, or the like), and the TCI state may be indicated to the UE 115 by the base station 105. In some cases, a set of TCI states may be indicated to a UE 115 via radio resource control (RRC) signaling, where some number of TCI states (e.g., a pool of 8 TCI states from of a total of 64 TCI states may be configured via RRC) and a particular TCI state may be indicated via downlink control information (DCI) (e.g., within a control resource set (CORESET)). The QCL relationship associated with the TCI state (and further established through higher-layer parameters) may provide the UE 115 with the QCL relationship for respective antenna ports and reference signals transmitted by the base station 105.

In some examples, the wireless communications system 100 may support sidelink communications between two or more wireless devices. For example, a first UE 115 may establish a communication with a second UE 115 and transmit signals to or receive signals from the second UE 115. In some examples (e.g., if operating in a first mode (Mode 1)), the first UE 115 or the second UE 115 may transmit a sidelink scheduling request requesting resources (e.g., time or frequency resources) for a sidelink communication as well as a sidelink buffer status report (BSR) indicating a buffer size associated with the sidelink communication to a base station 105. The BSR may also indicate a destination index (e.g., a SL-DestinationIdentity parameter) that identifies a destination associated with the sidelink communication and a logical channel group identifier which identifies a group of logical channels to which the sidelink BSR applies. In response to receiving the scheduling request and the sidelink BSR, the base station 105 may transmit a sidelink grant scheduling resources for the sidelink communication. Additionally or alternatively (e.g., if operating in a second mode (Mode 2)), the first UE 115 or the second UE 115 may autonomously select resources for the sidelink communication using a sidelink sensing procedure (e.g., a full-sensing or partial sensing procedure).

In some examples, the wireless communications system 100 may support devices having multiple TRPs. For example, a UE 115 may be an example of a multi-TRP (mTRP) UE 115 that includes two or more TRPs which perform separate radio-frequency and digital processing, but may have a common controller (e.g., a software or hardware controller). TRPs may be separated by some distance (e.g., three to four meters), which may allow each TRP to experience different channel conditions. As such, the UE 115 may use spatial domain multiplexing (SDM) which may allow the UE 115 to concurrently transmit or receive signals using multiple TRPs. For example, the UE 115 may be capable to receive a downlink communication from a base station 105 using one TRP concurrent to transmitting a sidelink communication to another UE 115 using a different TRP. Such operation may be referred to as full-duplex operation between a downlink and a sidelink. In some cases, however, a UE 115 may be incapable of performing full-duplex operations due to, for example, interference between TRPs. Accordingly, device may implement a method whereby a UE 115 may determine whether the UE 115 is capable to perform full-duplex operations on a downlink and a sidelink.

For example, a first UE 115 may establish communication link with a base station 105 and a sidelink communication link with a second UE 115 and may determine configurations for receiving downlink communications from the base station 105 and for transmitting sidelink communications to the UE 115. Based on the configurations, the first UE 115 may perform an interference measurement (e.g., a self-interference measurement) between TRPs associated with the first UE 115. For example, the first UE 115 may measure an amount of interference between a TRP used for receiving downlink communications from the base station 105 and a TRP used for transmitting sidelink communications to the second UE 115. The first UE 115 may determine (e.g., by comparing the interference measurement to a threshold) that the first UE 115 is capable to perform full-duplex operations and may transmit an indication of the capability of the first UE 115 to the base station 105.

In some cases, the second UE 115 may also perform one or more measurements (e.g., interference measurements) to inform whether the first UE 115 may use full-duplex communications. For example, the second UE 115 may measure interference on the sidelink communication link based on downlink communications from the base station 105 to the first UE 115. In such cases, the second UE 115 may perform the measurements using a directional beam (e.g., a receive beam) that the second UE 115 intends to use for sidelink communications with the first UE 115, which may be based on configuration information provided by the first UE 115, by the base station 105, or both. In some examples, the second UE 115 may determine interference based on transmission between the first UE 115 and the base station 105 (e.g., based on SSBs or other signals from the base station). The second UE 115 may accordingly report the measurement results (e.g., directly to the base station 105 or via the first UE 115). Based on measurements performed by the first UE 115, the second UE 115, or both, the base station 105 may transmit a resource grant allocating resources the first UE 115 is to use to concurrently receive downlink communications from the base station 105 and transmit sidelink communications to the second UE 115. Implementing aspects of the wireless communications system 100 may lead to an increased efficiency or a reduced latency of communications, among other benefits.

Figure 2:
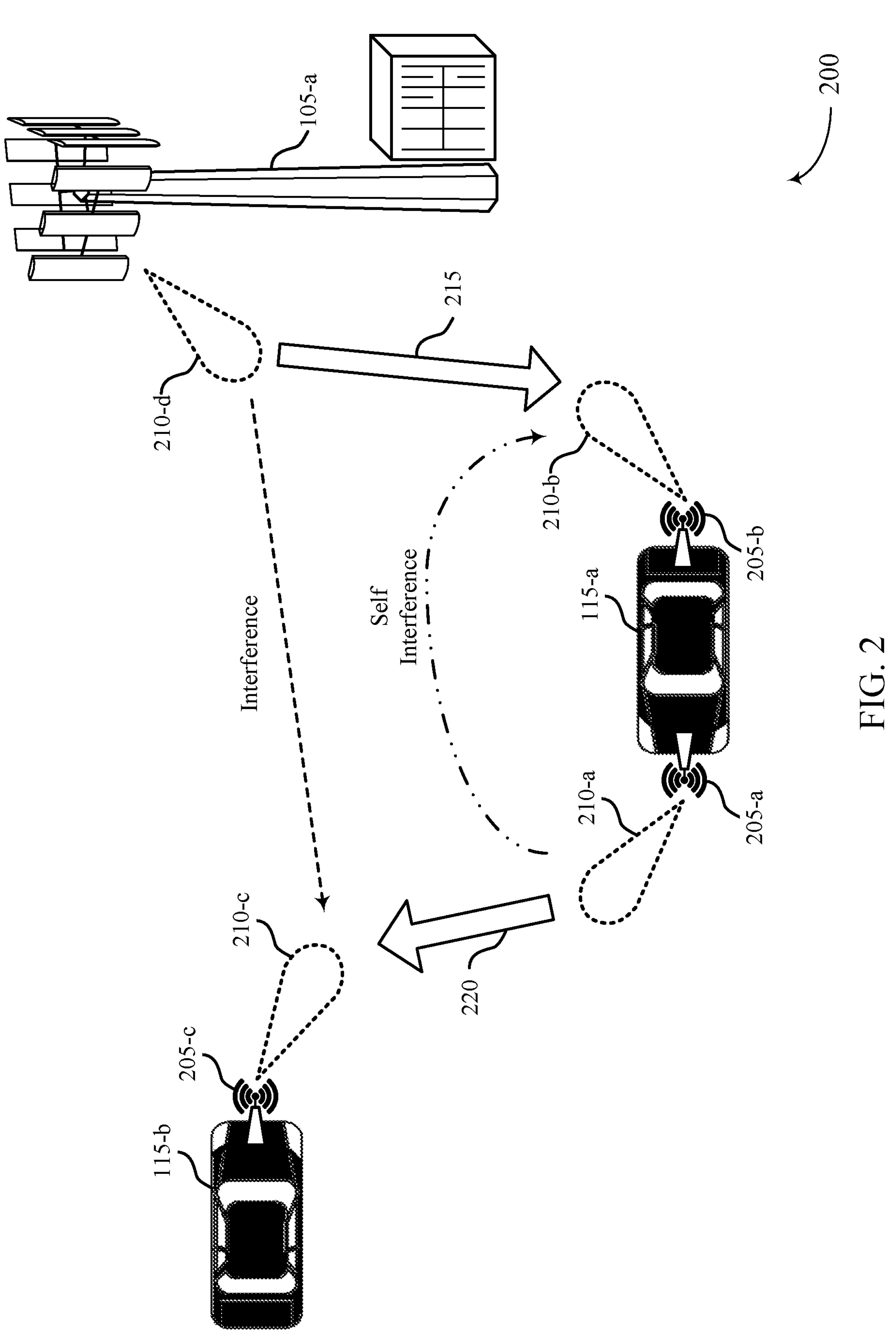

FIG. 2 illustrates an example of a wireless communications system 200 that supports techniques for full-duplex operation on sidelink and downlink in wireless communications systems in accordance with one or more aspects of the present disclosure. In some examples, the wireless communications system 200 may implement aspects of a wireless communications system 100 as described with reference to FIG. 1. The wireless communications system 200 may include a UE 115-*a* and a UE 115-*b* which may be examples of a UE 115 as described with reference to FIG. 1. The wireless communications system 200 may also include a base station 105-*a* which may be an example of a base station 105 as described with reference to FIG. 1. The UE 115-*a* and the UE 115-*b* may be examples of vehicle UEs 115 or any other type of wireless device which supports using multiple TRPs to perform communications.

In some examples, the wireless communications system 200 may support sidelink communications between devices. For example, the UE 115-*a* may establish a sidelink communication link 220 with the UE 115-*b* and transmit signals to or receive signals from the UE 115-*b*. In some examples, the UE 115-*a* may establish a sidelink communication link 220 with the UE 115-*b* in addition to establishing a communication link 215 (e.g., an access link, Uu interface) with the base station 105-*a*. During link establishment, the UE 115-*a* may undergo beam management operations. The beam management operations may allow the UE 115-*a* to select a beam pair to use for communication with the UE 115-*b* and a beam pair to use for communication with the base station 105-*b*. For example, the UE 115-*a* may utilize a directional beam 210-*a* to transmit sidelink signals to the UE 115-*b* and the UE 115-*b* may utilize a directional beam 210-*c* to receive the sidelink signals from the UE 115-*a*. Similarly, the UE 115-*a* may utilize a directional beam 210-*b* to receive a downlink signal from the base station 105-*a* and the base station 105-*a* may utilize a directional beam 210-*d* to transmit a downlink signal to the UE 115-*a*.

In some examples, the wireless communications system 200 may support devices performing full-duplex operations on multiple communication links which use different TRPs 205. For example, the UE 115 *a* may be an example of an mTRP UE that includes a TRP 205 *a* and a TRP 205 *b*. The UE 115-*a* may establish the communication link 215 with the base station 105-*a* using one TRP 205 and may establish the sidelink communication link 220 with the UE 115-*b* using another TRP 205. The TRP 205 *a* and the TRP 205 *b* may perform separate radio-frequency (RF) and digital processing, but may share a common controller (e.g., software or hardware controller). In some examples (e.g., based on channel conditions), the UE 115-*a* may be capable of performing full-duplex operations (e.g., concurrent transmitting and receiving) on the communication link 215 with the base station 105-*a* and sidelink with the UE 115-*b*. That is, the UE 115-*a* may be capable of receiving a downlink signal from the base station 105-*b* via TRP 205-*b* concurrent to the transmitting a sidelink signal to the UE 115-*b* via TRP 205-*a*. In another example, the UE 115-*a* may be capable of transmitting an uplink signal to the base station 105-*a* via TRP 205-*b* concurrent to transmitting a sidelink signals to the UE 115-*b* via TRP 205-*a*. However, using different techniques, a UE 115-*a* scheduled for concurrent uplink/downlink and sidelink transmissions may drop the transmission with a lower priority as to avoid interference even if an amount of interference associated with the concurrent transmissions is relatively low (e.g., below a threshold). As such, system resources may be underutilized in the event that concurrent transmissions are feasible. Accordingly, it may be advantageous to implement techniques whereby wireless devices in the wireless communications system 200 may determine a capability to perform full-duplex operations.

One such technique may include the UE 115-*a* performing an interference measurement between the communication link 215 with the base station 105-*a* and the sidelink with the UE 115-*b*. For example, the UE 115-*a* may perform a self-interference measurement based on trained beam directions associated with the communication link 215 and the sidelink communication link 220. The UE 115-*a* may determine whether the UE 115-*a* is capable to perform full-duplex operations based on the interference measurement (e.g., by comparing the interference measurement to a threshold). The UE 115-*a* may transmit an indication of the capability of the UE 115-*a* to perform full-duplex operations to the base station 105-*a*. For example, the UE 115-*a* may transmit (e.g., in a sidelink buffer status report) a message including an indication that the UE 115-*a* is capable to perform full-duplex operations. In some examples, the message may include additional information. For example, the UE 115-*a* may transmit, included with the indication, one or more downlink beam directions or indices (e.g., via a downlink transmission configuration indicator (TCI) state report) on which the UE 115-*a* is capable to receive downlink communications concurrent to transmitting sidelink communications. In some examples, the UE 115-*a* may also transmit (e.g., via a sidelink TCI state report) one or more sidelink beam directions or indices associated with beams on which the UE 115-*a* is to transmit sidelink communications to the UE 115-*b*. Similarly, the UE 115-*a* may transmit a destination identifier associated with the UE 115-*b* to the base station 105-*a*. In some examples, the indication may include a request for resources to perform full-duplex operations based on determining the capability of the UE 115-*a*.

In some examples, the UE 115-*a* may transmit the indication further based on an interference measurement performed by the UE 115-*b*. For example, the UE 115-*b* may perform interference measurements to determine if the UE 115-*b* is capable to receive sidelink communications from the UE 115-*a* concurrent to the base station 105-*b* transmitting downlink communications to the UE 115-*a*. In some examples, the UE 115-*b* may receive an interference measurement configuration from the UE 115-*a* for performing the interference measurements. For example, the UE 115-*a* may transmit a configuration including downlink beam directions or indices (e.g., a downlink TCI state) on which the UE 115-*a* may receive downlink communications from the base station 105-*a*. In some examples, the configuration may include indices associated with SSBs which are quasi co-located with the downlink beam directions. Based on the configuration, the UE 115-*b* may measure (e.g., to determine a reference signal received power (RSRP)) one or more SSBs using beam directions on which the UE 115-*b* may receive sidelink communications from the UE 115-*a*. The UE 115-*b* may transmit a result of the interference measurement or an indication of a capability of the UE 115-*b* to the UE 115-*a*.

In some examples, the base station 105-*a* may transmit the interference measurement configuration to the UE 115-*b*. For example, the base station 105-*a* may, in response to receive a sidelink buffer status report from the UE 115-*a*, transmit a configuration indicating a CSI-RS configuration, indices associated with one or more SSBs, a source identifier associated with the UE 115-*a*, or sidelink TCI states reported from the UE 115-*a* to the base station 105-*a*. Additionally or alternatively, the base station 105-*a* may indicate the UE 115-*b* to use a spatial configuration quasi co-located with one or more beam directions on which the UE 115-*b* may receive sidelink communications from the UE 115-*a*. The UE 115-*b* may perform interference measurements based on the configuration and report a result to the base station 105-*a*. In some examples, the UE 115-*b* may receive the configuration from a second base station 105 (e.g., such that the UE 115-*b* and the UE 115-*a* are associated with different base stations 105). In such examples, the UE 115-*b* may measure interference in relation to the second base station 105 and report the result accordingly. The second base station 105 may then transmit an indication of the result (e.g., via a backhaul link) to the base station 105-*a*.

In some examples, the base station 105-*a* may determine that the UE 115-*a* is capable to perform full-duplex operations based on the indication received from the UE 115-*a* or the indication received from the UE 115-*b*, or both. For example, the base station 105-*a* may receive an indication from the UE 115-*a* that the UE 115-*a* is capable to perform full-duplex operations. Additionally or alternatively, the base station 105-*a* may determine that the UE 115-*a* is capable to perform full-duplex operation based on interference measurements performed by the UE 115-*b*. Based on determining a capability of the UE 115-*a*, the base station 105-*a* may transmit a resource grant scheduling resources for the UE 115-*a* to receive downlink communications (e.g., to monitor a physical downlink control channel (PDCCH)) and to transmit sidelink communications. For example, the base station 105-*a* may schedule overlapping resources for the UE 115-*a* to concurrently receive downlink communications from the base station 105-*a* and transmit sidelink communications to the UE 115-*b*.

In some examples, the base station 105-*a* may configure a transmission power for the UE 115-*a* to use to transmit sidelink communications to the UE 115-*b*. For example, the base station 105-*a* may determine a transmission power for the UE 115-*a* to use based on interference measurements performed by the UE 115-*a*, the UE 115-*b*, or both. The base station 105-*a* may transmit one or more transmission power control commands to the UE 115-*a* indicating the transmission power. In some examples, the UE 115-*a* may determine another transmission power for transmitting the sidelink communications based on the interference measurements performed by the UE 115-*b*. For example, the UE 115-*a* may determine a lower transmission power if the interference measurement performed by the UE 115-*b* are low. In some examples, the UE 115-*a* may receive a first transmission power from the base station 105-*a* and may determine a second transmission power based on the interference measurements performed by the UE 115-*b*. The UE 115-*a* may determine a transmission power to use based on comparing the first and second transmission powers. For example, the UE 115-*a* may apply the second transmission power if the second transmission power is less than the first transmission power. Implementing aspects of the present disclosure may enable the wireless communications system 200 to perform techniques for full-duplex operation which may lead to an increased efficiency or a reduced latency, among other benefits.

Figure 3:
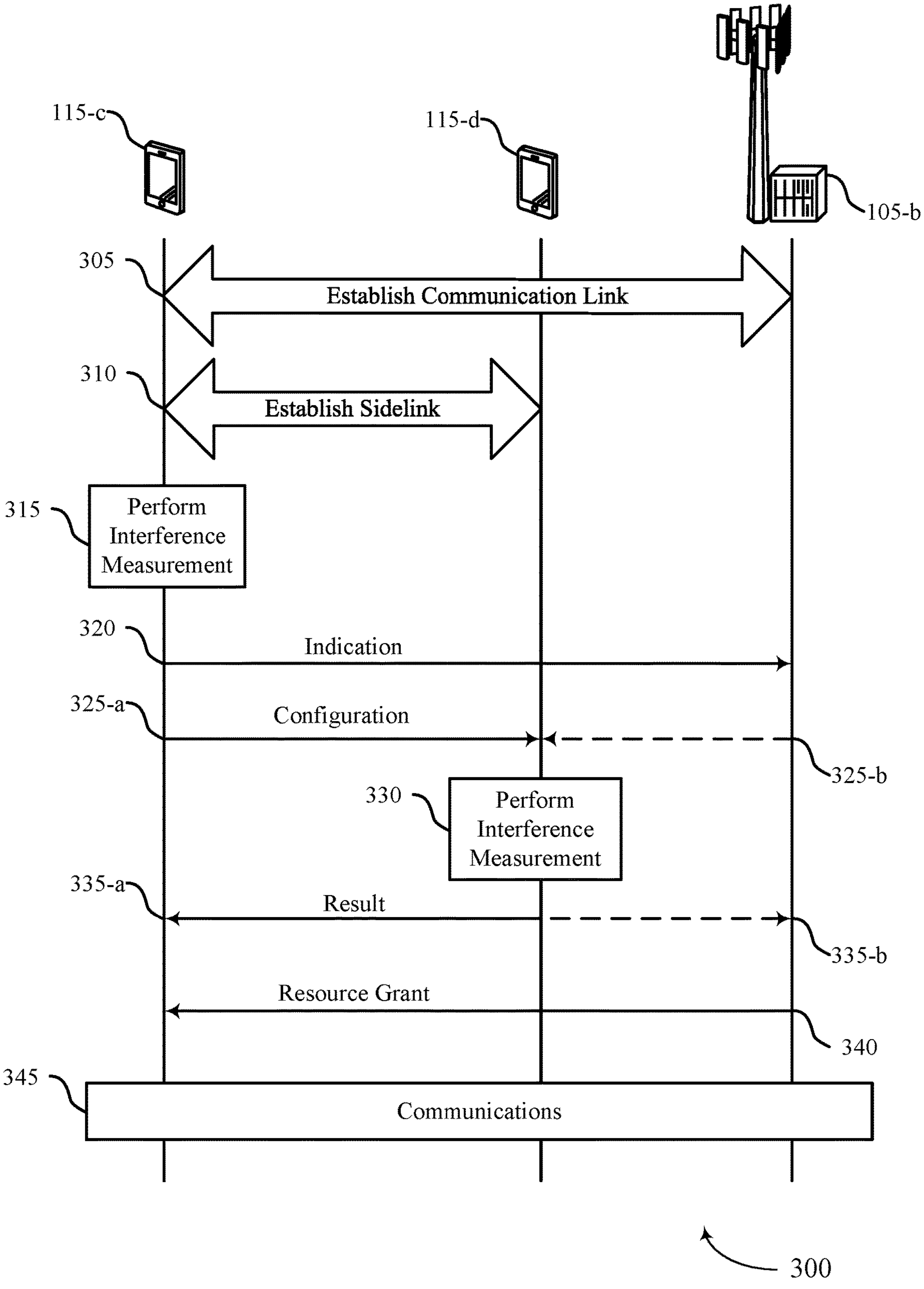
FIG. 3 illustrates an example of a process flow in a system that supports techniques for full-duplex operation on sidelink and downlink in wireless communications systems in accordance with aspects of the present disclosure.

FIG. 3 illustrates an example of a process flow 300 in a system that supports techniques for full-duplex operation on sidelink and downlink in wireless communications systems in accordance with one or more aspects of the wireless communications systems 100 or 200 as described with reference to FIGS. 1 and 2. The process flow 300 may include a UE 115-*c*, a UE 115-*d*, and a base station 105-*b* which may be examples of the corresponding devices described herein. In some examples, the UE 115-*c* may be an example of a multi-TRP UE 115 such that the UE 115-*c* may communicate with one or more devices using different TRPs at the UE 115-*c*. Alternative examples of the following may be implemented in which some processes are performed in a different order than described or are not performed at all. In some examples, the processes may include additional features not mentioned below, or further processes may be added.

At 305, the UE 115-*c* may establish a communication link (e.g., an access link or Uu interface) with the base station 105-*b*. Similarly, at 310, the UE 115-*c* may establish a sidelink communication link with the UE 115-*d*. In some examples, the UE 115-*c* may establish the communication link with the base station 105-*b* and the sidelink communication link with the UE 115-*d* using different TRPs at the UE 115-*c*.

At 315, the UE 115-*c* may perform an interference measurement (e.g., a self-interference measurement) between the TRPs used for communication with the base station 105-*b* and the UE 115-*d*. For example, the UE 115-*c* may measure interference between downlink communications received from the base station 105-*b* and sidelink communications transmitted to the UE 115-*d*. In some examples, the UE 115-*c* may perform the interference measurement based on beam configurations (e.g., beam directions) associated with the communication link with the base station 105-*b* and the sidelink with the UE 115-*d*.

At 320, the UE 115-*c* may transmit an indication of a capability of the UE 115-*c* to perform full-duplex operations on the communication link with the base station 105-*b* and the sidelink with the UE 115-*d*. For example, the UE 115-*c* may determine that the interference measurement satisfies a threshold such that the UE 115-*c* is capable to perform full-duplex operations and may transmit the indication accordingly. In some examples, the UE 115-*c* may determine that the interference measurement does not satisfy the threshold and may transmit an indication that the UE 115-*c* is incapable to perform full-duplex operations.

At 325-*a*, the UE 115-*c* may transmit an interference measurement configuration to the UE 115-*d* indicating the UE 115-*d* to perform an interference measurement between downlink communications transmitted by the base station 105-*b* and sidelink communications transmitted by the UE 115-*c*. For example, the UE 115-*c* may indicate the UE 115-*d* to measure one or more SSBs which are quasi co-located with beam directions which the base station 105-*b* may use to transmit downlink communications to the UE 115-*d*.

At 330, the UE 115-*d* may perform an interference measurement (e.g., a RSRP measurement) based on the configuration received from the UE 115-*c*. In some examples, the UE 115-*d* may perform the interference measurement using a beam direction on which the UE 115-*d* may receive sidelink communications from the UE 115-*c*. In some examples, the UE 115-*d* may determine whether the UE 115-*d* is capable to receive sidelink communications from the UE 115-*c* concurrent to downlink communications transmitted by the base station 105-*b*. At 335-*a*, the UE 115-*d* may transmit an indication of the determination or the interference measurement to the UE 115-*c*.

Additionally or alternatively, at 325-*b*, the base station 105-*b* may transmit an interference measurement to the UE 115-*d*. For example, in response to receiving an indication of the capability of the UE 115-*c* from the UE 115-*c* (e.g., in a sidelink buffer status report), the base station 105-*b* may indicate the UE 115-*d* to perform an interference measurement between downlink communications transmitted by the base station 105-*b* and sidelink communications transmitted by the UE 115-*c*. In some examples, the base station 105-*b* may indicate one or more of a CSI-RS configuration, SSB indices or a spatial configuration which the UE 115-*d* is to use for performing the interference measurement. Accordingly, in response to performing the interference measurement at 330, the UE 115-*d* may, at 335-*b*, transmit an indication of the result of the interference measurement to the base station 105-*b*. In some examples, the UE 115-*d* may receive the configuration from and transmit the indication to a second base station such that the second base station transmits the information (e.g., via a backhaul link) to the base station 105-*b*.

At 340, the base station 105-*b* may, based on determining whether the UE 115-*c* is capable to perform full-duplex operations, transmit a resource grant to the UE 115-*c* indicating resources for transmitting sidelink communications to the UE 115-*d* and resources for receiving downlink communications from the base station 105-*b*. If the base station 105-*b* determines that the UE 115-*c* is capable to perform full-duplex operations (e.g., based on receiving indications from the UE 115-*c*, the UE 115-*d*, or both) then the resource grant may indicate overlapping sets of resources for the UE 115-*c* to concurrently receive downlink communications and transmit sidelink communications. At 345, the UE 115-*c*, the UE 115-*d*, and the base station 105-*b* may perform communications based on the resource grant transmitted by the base station 105-*b*. Implementing aspects of the process flow 300 may enable devices in a wireless communications system to perform full-duplex operations with multiple devices which may lead to an increased efficiency or reduced latency, among other benefits.

Figure 4:
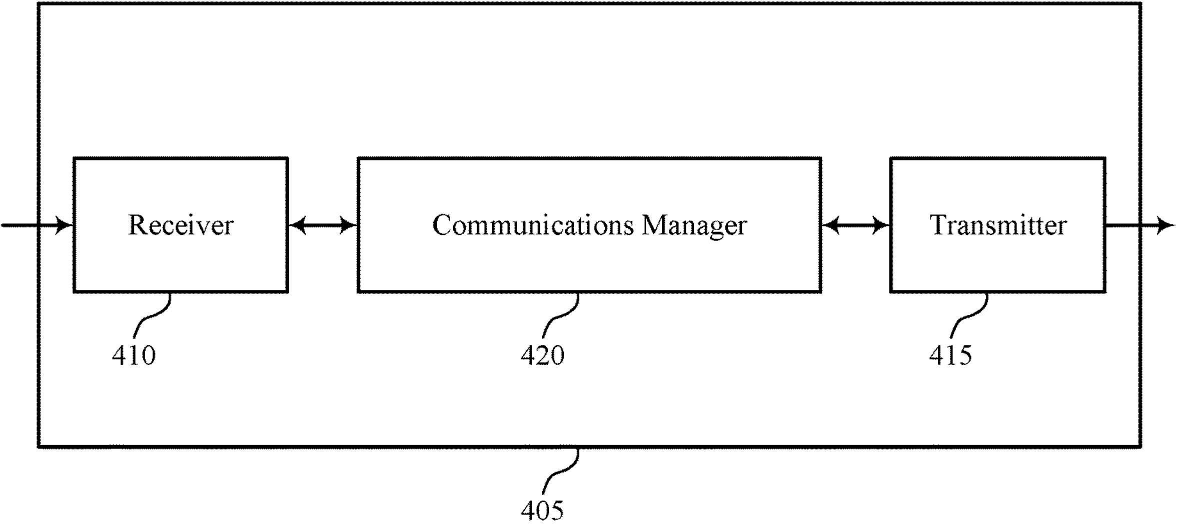
FIGS. 4 and 5 show block diagrams of devices that support techniques for full-duplex operation on sidelink and downlink in wireless communications systems in accordance with aspects of the present disclosure.

FIG. 4 shows a block diagram 400 of a device 405 that supports techniques for full-duplex operation on sidelink and downlink in wireless communications systems in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for full-duplex operation on sidelink and downlink in wireless communications systems). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for full-duplex operation on sidelink and downlink in wireless communications systems). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for full-duplex operation on sidelink and downlink in wireless communications systems as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a first UE in accordance with examples as disclosed herein. For example, the communications manager 420 may be configured as or otherwise support a means for establishing a first communication link with a base station and a sidelink communication link with a second UE. In some examples, the first communication link may be associated with a first transmission reception point of a set of transmission reception points at the first UE and the sidelink communication link may be associated with a second transmission reception point of the set of transmission reception points at the first UE. The communications manager 420 may be configured as or otherwise support a means for performing an interference measurement for sidelink communications transmitted on the sidelink communication link and downlink communications received on the first communication link, where the interference measurement is based on a first configuration for downlink reception on the first communication link and a second configuration for sidelink transmission on the sidelink communication link. The communications manager 420 may be configured as or otherwise support a means for transmitting, to the base station, a message indicating whether the first UE is capable of concurrently receiving downlink communications on the first communication link and transmitting sidelink communications on the sidelink communication link based on the interference measurement.

Additionally or alternatively, the communications manager 420 may support wireless communications at a first UE in accordance with examples as disclosed herein. For example, the communications manager 420 may be configured as or otherwise support a means for establishing a sidelink communication link with a second UE. The communications manager 420 may be configured as or otherwise support a means for receiving a message indicating an interference measurement configuration for the first UE to perform one or more interference measurements for downlink communications from a base station to the second UE and sidelink communications from the second UE. The communications manager 420 may be configured as or otherwise support a means for transmitting an interference measurement report including a result of the one or more interference measurements performed based on the interference measurement configuration.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for full-duplex operation between downlink and sidelink communication links such that the device 405 may exhibit an increased efficiency of communications and usage of resources, reduced processing, or reduced power consumption, among other benefits. In particular, the device 405 may determine whether to use full-duplex communications based on various channel or traffic conditions, which may avoid dropping transmissions (e.g., avoid dropping one or both of sidelink communications on a sidelink communication link or communications on an access link).

Figure 5:
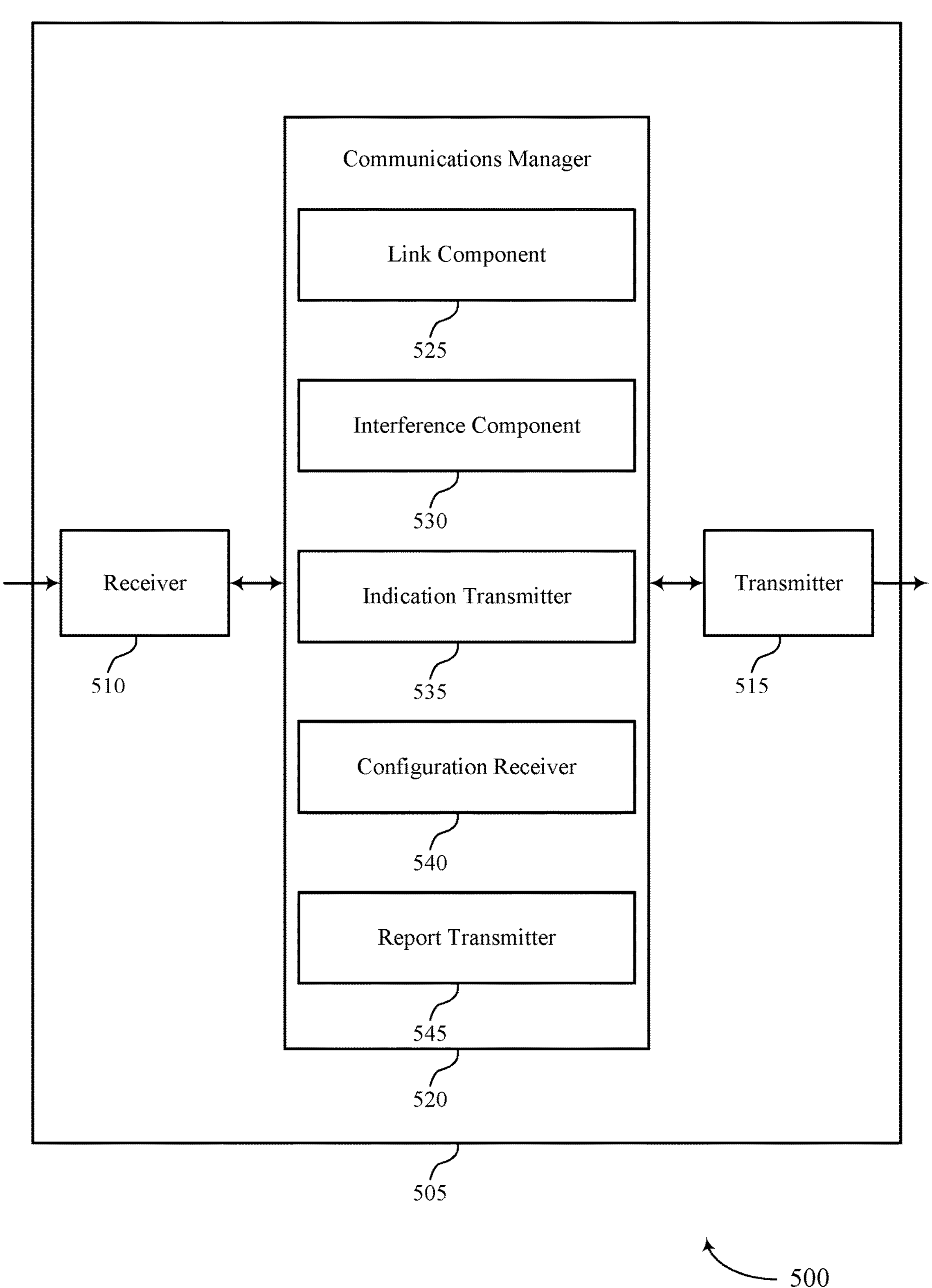

FIG. 5 shows a block diagram 500 of a device 505 that supports techniques for full-duplex operation on sidelink and downlink in wireless communications systems in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for full-duplex operation on sidelink and downlink in wireless communications systems). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for full-duplex operation on sidelink and downlink in wireless communications systems). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for full-duplex operation on sidelink and downlink in wireless communications systems as described herein. For example, the communications manager 520 may include a link component 525, an interference component 530, an indication transmitter 535, a configuration receiver 540, a report transmitter 545, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. The link component 525 may be configured as or otherwise support a means for establishing a first communication link with a base station and a sidelink communication link with a second UE, where the first communication link is associated with a first transmission reception point of a set of transmission reception points at the first UE and the sidelink communication link is associated with a second transmission reception point of the set of transmission reception points at the first UE. The interference component 530 may be configured as or otherwise support a means for performing an interference measurement for sidelink communications transmitted on the sidelink communication link and downlink communications received on the first communication link, where the interference measurement is based on a first configuration for downlink reception on the first communication link and a second configuration for sidelink transmission on the sidelink communication link. The indication transmitter 535 may be configured as or otherwise support a means for transmitting, to the base station, a message indicating whether the first UE is capable of concurrently receiving downlink communications on the first communication link and transmitting sidelink communications on the sidelink communication link based on the interference measurement.

Additionally or alternatively, the communications manager 520 may support wireless communications at a first UE in accordance with examples as disclosed herein. The link component 525 may be configured as or otherwise support a means for establishing a sidelink communication link with a second UE. The configuration receiver 540 may be configured as or otherwise support a means for receiving a message indicating an interference measurement configuration for the first UE to perform one or more interference measurements for downlink communications from a base station to the second UE and sidelink communications from the second UE. The report transmitter 545 may be configured as or otherwise support a means for transmitting an interference measurement report including a result of the one or more interference measurements performed based on the interference measurement configuration.

Figure 6:
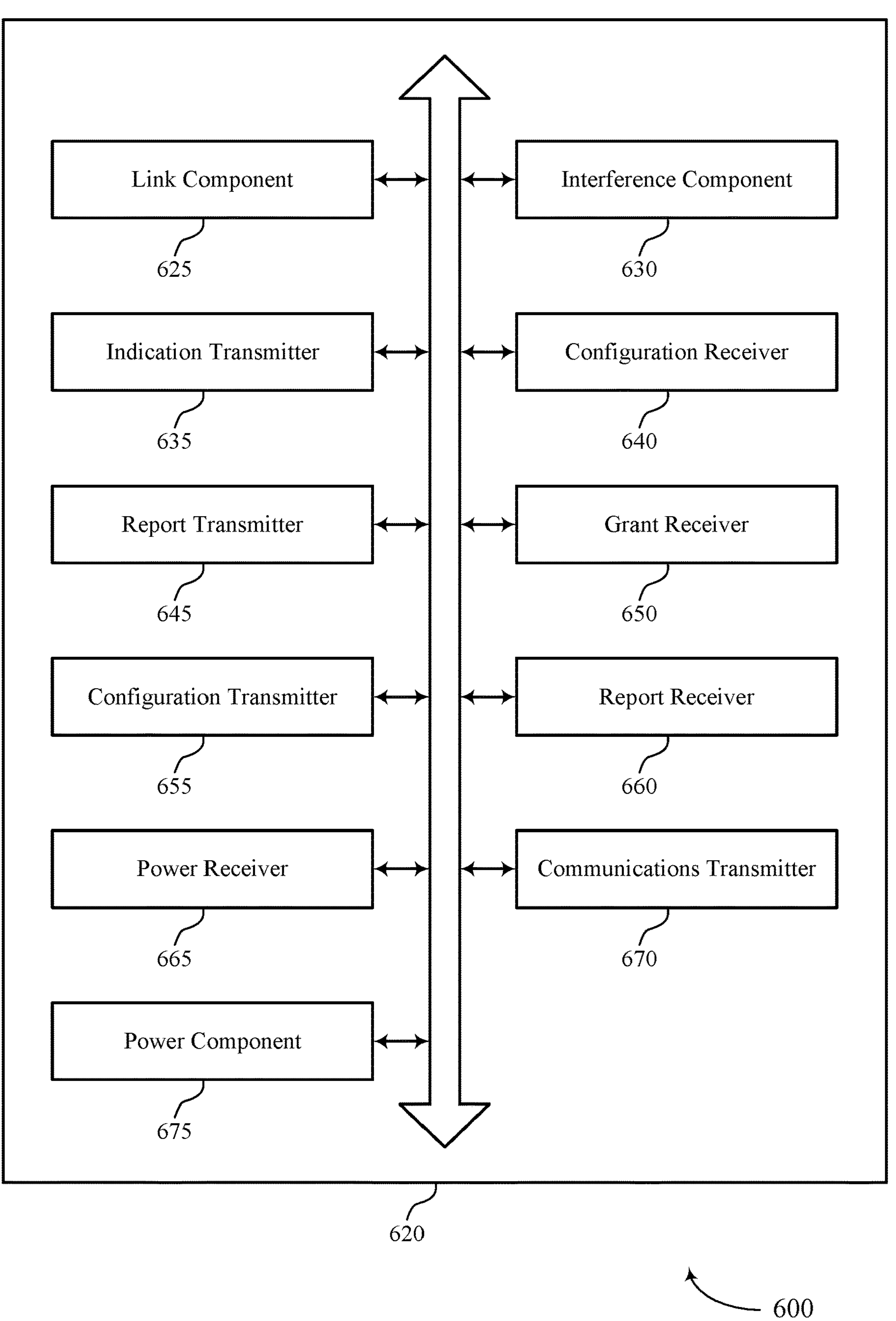
FIG. 6 shows a block diagram of a communications manager that supports techniques for full-duplex operation on sidelink and downlink in wireless communications systems in accordance with aspects of the present disclosure.

FIG. 6 shows a block diagram 600 of a communications manager 620 that supports techniques for full-duplex operation on sidelink and downlink in wireless communications systems in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for full-duplex operation on sidelink and downlink in wireless communications systems as described herein. For example, the communications manager 620 may include a link component 625, an interference component 630, an indication transmitter 635, a configuration receiver 640, a report transmitter 645, a grant receiver 650, a configuration transmitter 655, a report receiver 660, a power receiver 665, a communications transmitter 670, a power component 675, or any combination thereof. Each of these components may communicate, directly or indirectly, with one another (e.g., via one or more buses).

The communications manager 620 may support wireless communications at a first UE in accordance with examples as disclosed herein. The link component 625 may be configured as or otherwise support a means for establishing a first communication link with a base station and a sidelink communication link with a second UE, where the first communication link is associated with a first transmission reception point of a set of transmission reception points at the first UE and the sidelink communication link is associated with a second transmission reception point of the set of transmission reception points at the first UE. The interference component 630 may be configured as or otherwise support a means for performing an interference measurement for sidelink communications transmitted on the sidelink communication link and downlink communications received on the first communication link, where the interference measurement is based on a first configuration for downlink reception on the first communication link and a second configuration for sidelink transmission on the sidelink communication link. The indication transmitter 635 may be configured as or otherwise support a means for transmitting, to the base station, a message indicating whether the first UE is capable of concurrently receiving downlink communications on the first communication link and transmitting sidelink communications on the sidelink communication link based on the interference measurement.

In some examples, the link component 625 may be configured as or otherwise support a means for determining that the first UE is capable of concurrently receiving the downlink communications on the first communication link and transmitting the sidelink communications on the sidelink communication link based on determining that the interference measurement satisfies a threshold, where transmitting the message is based on the determination. In some examples, the grant receiver 650 may be configured as or otherwise support a means for receiving, from the base station, a resource grant indicating a first set of resources and a second set of resources, where the first set of resources and the second set of resources are configured for concurrently receiving a downlink message from the base station on the first communication link and transmitting a sidelink message to the second UE on the sidelink communication link, the first set of resources at least partially overlapping with the second set of resources.

In some examples, the resource grant includes a downlink transmission configuration indicator state the first UE is to use for concurrently monitoring a downlink control channel while transmitting the sidelink message on the sidelink communication link. In some examples, receiving the downlink message is based on monitoring the downlink control channel.

In some examples, the link component 625 may be configured as or otherwise support a means for determining that the first UE is incapable of concurrently receiving downlink communications on the first communication link and transmitting sidelink communications on the sidelink communication link based on determining that the interference measurement fails to satisfy a threshold, where transmitting the message is based on the determination.

In some examples, the configuration transmitter 655 may be configured as or otherwise support a means for transmitting, to the second UE, an interference measurement configuration for the second UE to perform one or more interference measurements between downlink communications from the base station to the first UE and sidelink communications from the first UE to the second UE. In some examples, the report receiver 660 may be configured as or otherwise support a means for receiving, from the second UE, an interference measurement report including a result of the one or more interference measurements.

In some examples, the interference measurement configuration includes one or more downlink beam directions associated with the downlink communications on the first communication link, one or more beam indices associated with one or more reference signals that are quasi co-located with the one or more downlink beam directions, one or more downlink transmission configuration indicator states indicating the one or more downlink beam directions, or any combination thereof.

In some examples, to support receiving the interference measurement report including the result of the one or more interference measurements, the report receiver 660 may be configured as or otherwise support a means for receiving an indication that the second UE is capable of concurrently receiving sidelink communications from the first UE while the first UE receives downlink communications from the base station based on the result of the one or more interference measurements.

In some examples, the power component 675 may be configured as or otherwise support a means for determining a transmission power for transmitting the sidelink communications on the sidelink communication link based on the result of the one or more interference measurements from the second UE. In some examples, the communications transmitter 670 may be configured as or otherwise support a means for transmitting sidelink communications on the sidelink communication link based on the transmission power.

In some examples, the power receiver 665 may be configured as or otherwise support a means for receiving, from the base station, an indication of a first transmission power for the sidelink communications on the sidelink communication link, where the transmission power is based on an adjustment of the first transmission power and the result of the one or more interference measurements.

In some examples, the message further includes an indication of one or more of a destination identification associated with the second UE, one or more sidelink beam directions associated with the sidelink communications, or one or more beam directions the first UE is capable of using for concurrently receiving the downlink communications and transmitting the sidelink communications.

In some examples, the power receiver 665 may be configured as or otherwise support a means for receiving, from the base station, one or more transmission power control commands associated with a transmission power the first UE is to use to transmit sidelink communications on the sidelink communication link. In some examples, the communications transmitter 670 may be configured as or otherwise support a means for transmitting sidelink communications on the sidelink communication link based on receiving the one or more transmission power control commands.

Additionally or alternatively, the communications manager 620 may support wireless communications at a first UE in accordance with examples as disclosed herein. In some examples, the link component 625 may be configured as or otherwise support a means for establishing a sidelink communication link with a second UE. The configuration receiver 640 may be configured as or otherwise support a means for receiving a message indicating an interference measurement configuration for the first UE to perform one or more interference measurements for downlink communications from a base station to the second UE and sidelink communications from the second UE. The report transmitter 645 may be configured as or otherwise support a means for transmitting an interference measurement report including a result of the one or more interference measurements performed based on the interference measurement configuration.

In some examples, to support receiving the interference measurement configuration, the configuration receiver 640 may be configured as or otherwise support a means for receiving the interference measurement configuration from the second UE, where the interference measurement report including the result of the one or more interference measurements is transmitted to the second UE.

In some examples, the interference measurement configuration includes one or more downlink beam directions associated with the downlink communications on a first communication link, one or more beam indices associated with one or more reference signals that are quasi co-located with the one or more downlink beam directions, one or more downlink transmission configuration indicator states indicating the one or more downlink beam directions, or any combination thereof.

In some examples, the interference component 630 may be configured as or otherwise support a means for performing the one or more interference measurements based on the interference measurement configuration, the one or more interference measurements including measurements of one or more reference signals using a beam direction associated with the sidelink communication link on which the first UE is to receive sidelink communications from the second UE.

In some examples, the interference component 630 may be configured as or otherwise support a means for determining one or more of a reference signal received power, a signal-to-interference-plus-noise ratio, or a received signal strength indicator associated with the one or more reference signals.

In some examples, the interference component 630 may be configured as or otherwise support a means for determining that the one or more interference measurements satisfy a threshold. In some examples, the report transmitter 645 may be configured as or otherwise support a means for transmitting, to the second UE, an indication that the second UE is capable of concurrently receiving sidelink communications from the first UE while the first UE receives downlink communications from the base station based on the result of the one or more interference measurements, where transmitting the indication is based on the one or more interference measurements satisfying the threshold.

In some examples, to support receiving the interference measurement configuration, the link component 625 may be configured as or otherwise support a means for establishing a first communication link with a first base station. In some examples, to support receiving the interference measurement configuration, the configuration receiver 640 may be configured as or otherwise support a means for receiving the interference measurement configuration from the first base station, where the interference measurement report including the result of the one or more interference measurements is transmitted to the first base station.

In some examples, the interference measurement configuration includes one or more of a downlink channel state information reference signal configuration, indices associated with one or more synchronization signal blocks, a source identification associated with the second UE, or one or more sidelink transmission configuration indicator states associated with the sidelink communication link with the second UE.

In some examples, the interference measurement configuration indicates that the first UE perform the one or more interference measurements using a spatial configuration quasi co-located with one or more beam directions on which the first UE is to receive sidelink communications from the second UE.

In some examples, the first base station is the same as the base station. In some examples, the first base station is different from the base station.

Figure 7:
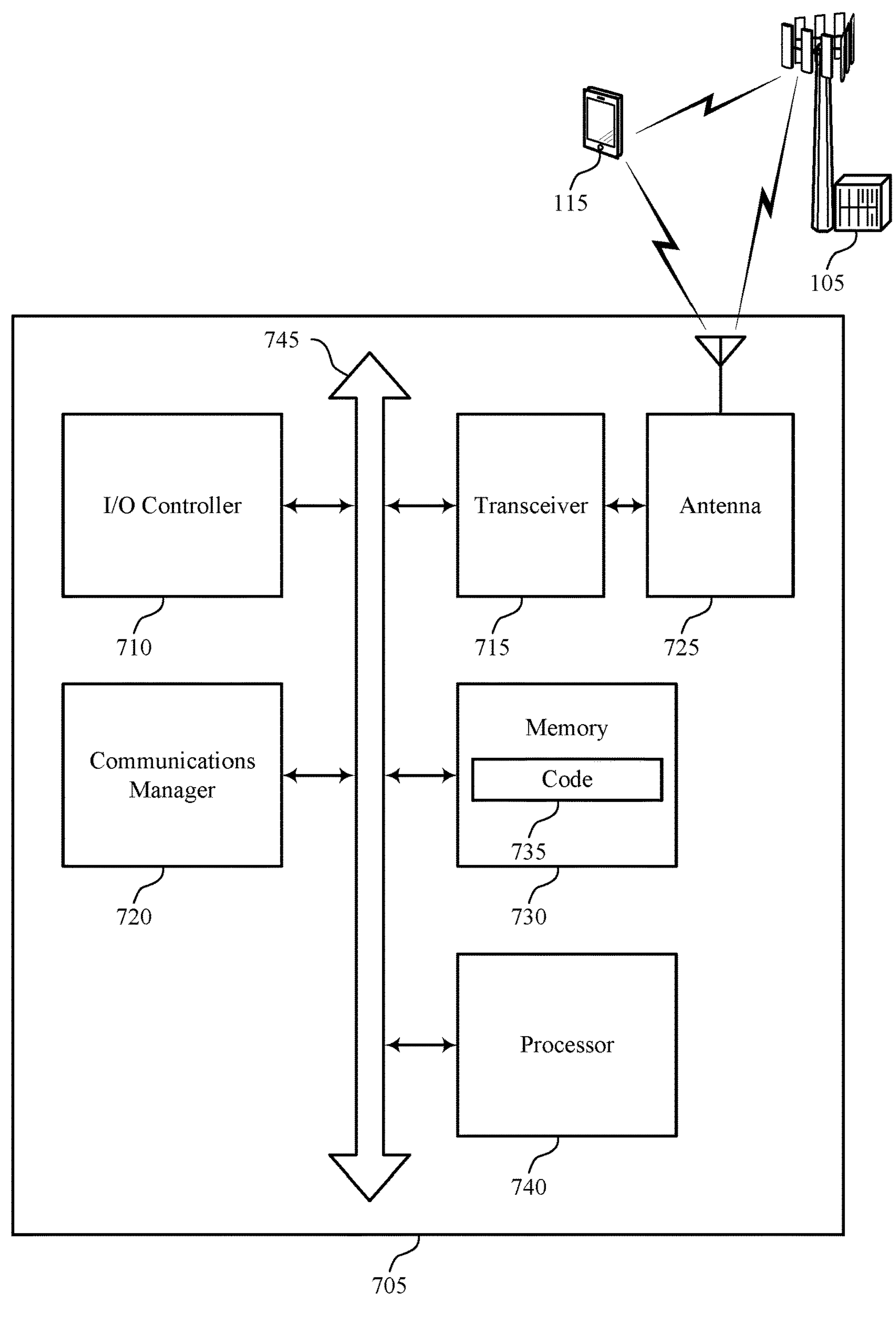
FIG. 7 shows a diagram of a system including a device that supports techniques for full-duplex operation on sidelink and downlink in wireless communications systems in accordance with aspects of the present disclosure.

FIG. 7 shows a diagram of a system 700 including a device 705 that supports techniques for full-duplex operation on sidelink and downlink in wireless communications systems in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for full-duplex operation on sidelink and downlink in wireless communications systems). For example, the device 705 or a component of the device 705 may include a processor 740 and memory 730 coupled to the processor 740, the processor 740 and memory 730 configured to perform various functions described herein.

The communications manager 720 may support wireless communications at a first UE in accordance with examples as disclosed herein. For example, the communications manager 720 may be configured as or otherwise support a means for establishing a first communication link with a base station and a sidelink communication link with a second UE, where the first communication link is associated with a first transmission reception point of a set of transmission reception points at the first UE and the sidelink communication link is associated with a second transmission reception point of the set of transmission reception points at the first UE. The communications manager 720 may be configured as or otherwise support a means for performing an interference measurement for sidelink communications transmitted on the sidelink communication link and downlink communications received on the first communication link, where the interference measurement is based on a first configuration for downlink reception on the first communication link and a second configuration for sidelink transmission on the sidelink communication link. The communications manager 720 may be configured as or otherwise support a means for transmitting, to the base station, a message indicating whether the first UE is capable of concurrently receiving downlink communications on the first communication link and transmitting sidelink communications on the sidelink communication link based on the interference measurement.

Additionally or alternatively, the communications manager 720 may support wireless communications at a first UE in accordance with examples as disclosed herein. For example, the communications manager 720 may be configured as or otherwise support a means for establishing a sidelink communication link with a second UE. The communications manager 720 may be configured as or otherwise support a means for receiving a message indicating an interference measurement configuration for the first UE to perform one or more interference measurements for downlink communications from a base station to the second UE and sidelink communications from the second UE. The communications manager 720 may be configured as or otherwise support a means for transmitting an interference measurement report including a result of the one or more interference measurements performed based on the interference measurement configuration.

By including or configuring the communications manager 720 in accordance with examples as described herein, the device 705 may support techniques for full-duplex operation between downlink and sidelink communication links such that the device 705 may exhibit an increased efficiency of communications and usage of resources, a reduced latency, a reduced power consumption, or an improved user experience, among other benefits.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for full-duplex operation on sidelink and downlink in wireless communications systems as described herein, or the processor 740 and the memory 730 may be otherwise configured to perform or support such operations.

Figure 8:
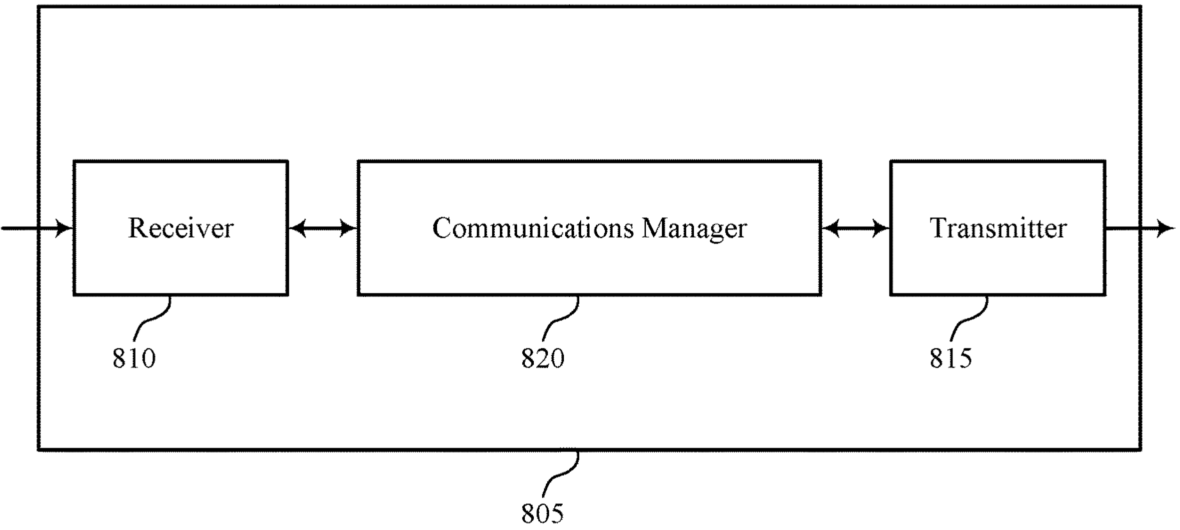
FIGS. 8 and 9 show block diagrams of devices that support techniques for full-duplex operation on sidelink and downlink in wireless communications systems in accordance with aspects of the present disclosure.

FIG. 8 shows a block diagram 800 of a device 805 that supports techniques for full-duplex operation on sidelink and downlink in wireless communications systems in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for full-duplex operation on sidelink and downlink in wireless communications systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for full-duplex operation on sidelink and downlink in wireless communications systems). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for full-duplex operation on sidelink and downlink in wireless communications systems as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for establishing a first communication link with a first UE. The communications manager 820 may be configured as or otherwise support a means for determining that the first UE is capable of concurrently receiving downlink communications on the first communication link and transmitting sidelink communications on a sidelink communication link between the first UE and a second UE. The communications manager 820 may be configured as or otherwise support a means for transmitting a resource grant indicating a first set of resources and a second set of resources based on the determination, where the first set of resources and the second set of resources are configured for concurrently receiving a downlink message from the base station on the first communication link and transmitting a sidelink message from the first UE to the second UE on the sidelink communication link, the first set of resources at least partially overlapping with the second set of resources.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for full-duplex operation between downlink and sidelink communication links such that the device 805 may exhibit an increased efficiency of communication and resource usage, a reduced latency, or a reduced power consumption, among other benefits.

Figure 9:
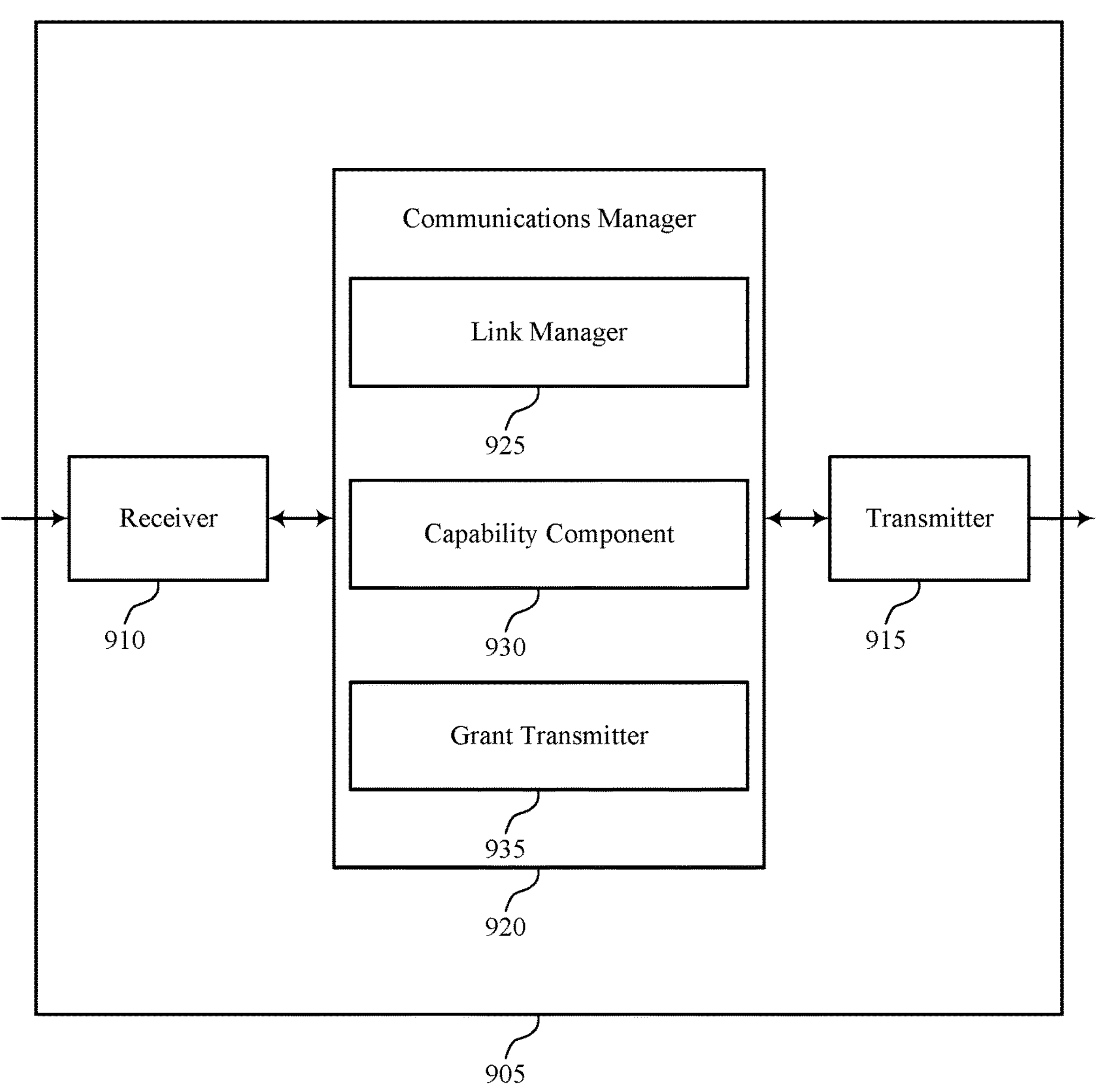

FIG. 9 shows a block diagram 900 of a device 905 that supports techniques for full-duplex operation on sidelink and downlink in wireless communications systems in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for full-duplex operation on sidelink and downlink in wireless communications systems). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for full-duplex operation on sidelink and downlink in wireless communications systems). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for full-duplex operation on sidelink and downlink in wireless communications systems as described herein. For example, the communications manager 920 may include a link manager 925, a capability component 930, a grant transmitter 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The link manager 925 may be configured as or otherwise support a means for establishing a first communication link with a first UE. The capability component 930 may be configured as or otherwise support a means for determining that the first UE is capable of concurrently receiving downlink communications on the first communication link and transmitting sidelink communications on a sidelink communication link between the first UE and a second UE. The grant transmitter 935 may be configured as or otherwise support a means for transmitting a resource grant indicating a first set of resources and a second set of resources based on the determination, where the first set of resources and the second set of resources are configured for concurrently receiving a downlink message from the base station on the first communication link and transmitting a sidelink message from the first UE to the second UE on the sidelink communication link, the first set of resources at least partially overlapping with the second set of resources.

Figure 10:
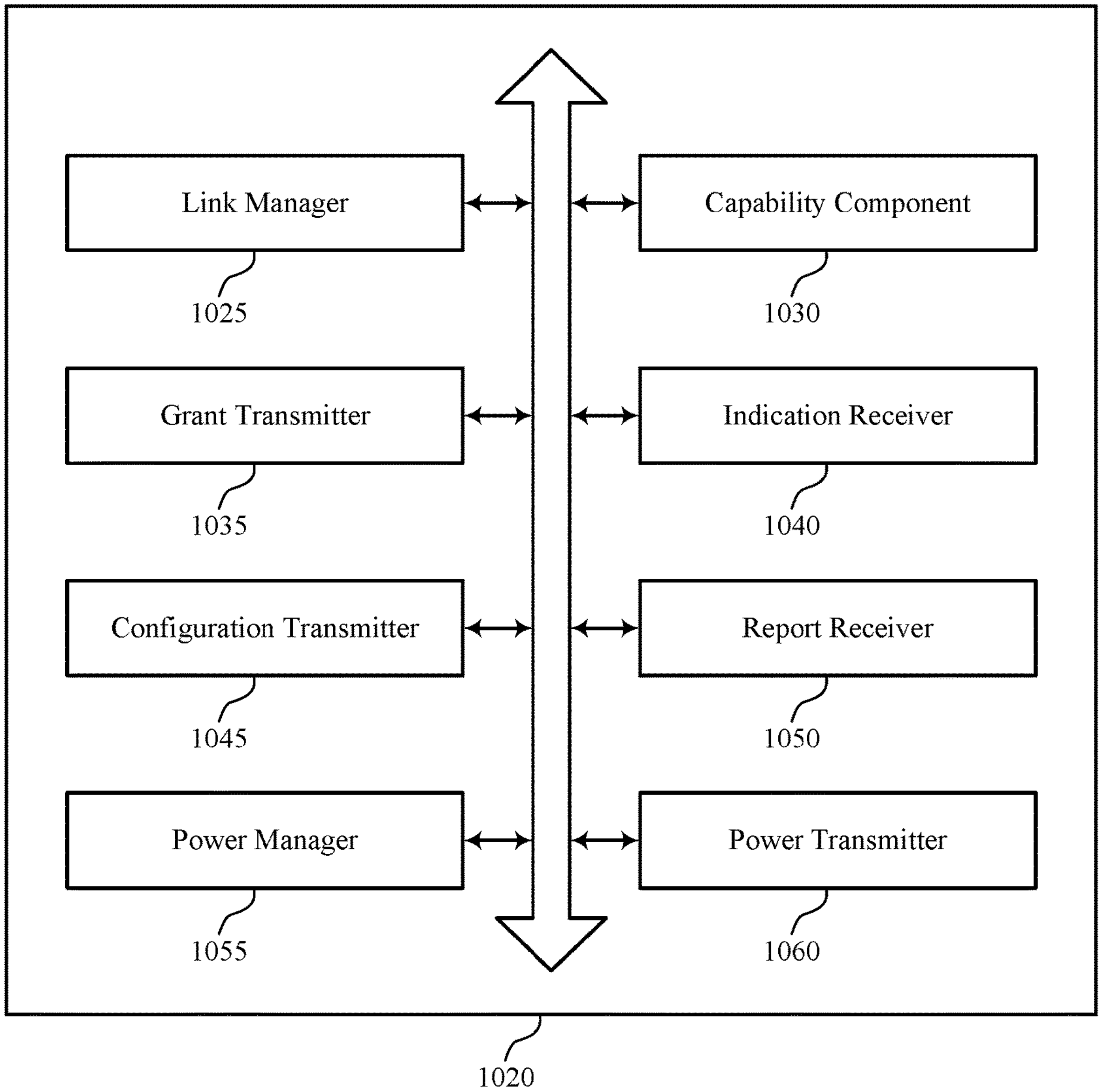
FIG. 10 shows a block diagram of a communications manager that supports techniques for full-duplex operation on sidelink and downlink in wireless communications systems in accordance with aspects of the present disclosure.

FIG. 10 shows a block diagram 1000 of a communications manager 1020 that supports techniques for full-duplex operation on sidelink and downlink in wireless communications systems in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for full-duplex operation on sidelink and downlink in wireless communications systems as described herein. For example, the communications manager 1020 may include a link manager 1025, a capability component 1030, a grant transmitter 1035, an indication receiver 1040, a configuration transmitter 1045, a report receiver 1050, a power manager 1055, a power transmitter 1060, or any combination thereof. Each of these components may communicate, directly or indirectly, with one another (e.g., via one or more buses).

The communications manager 1020 may support wireless communications at a base station in accordance with examples as disclosed herein. The link manager 1025 may be configured as or otherwise support a means for establishing a first communication link with a first UE. The capability component 1030 may be configured as or otherwise support a means for determining that the first UE is capable of concurrently receiving downlink communications on the first communication link and transmitting sidelink communications on a sidelink communication link between the first UE and a second UE. The grant transmitter 1035 may be configured as or otherwise support a means for transmitting a resource grant indicating a first set of resources and a second set of resources based on the determination, where the first set of resources and the second set of resources are configured for concurrently receiving a downlink message from the base station on the first communication link and transmitting a sidelink message from the first UE to the second UE on the sidelink communication link, the first set of resources at least partially overlapping with the second set of resources.

In some examples, to support determining that the first UE is capable of concurrently receiving the downlink communications on the first communication link and transmitting the sidelink communications on the sidelink communication link, the indication receiver 1040 may be configured as or otherwise support a means for receiving, from the first UE, a message indicating a capability of the first UE to concurrently receiving the downlink communications on the first communication link and transmitting the sidelink communications on the sidelink communication link, the capability being based on an interference measurement for sidelink communications transmitted on the sidelink communication link and downlink communications received on the first communication link, where the determination is based on the indication of the capability.

In some examples, the message further includes an indication of one or more of a destination identification associated with the second UE, one or more sidelink beam directions the first UE is to use for transmission sidelink communications to the second UE, or one or more beam directions on which the first UE is capable to receive downlink communications from the base station and concurrently transmit sidelink communications to the second UE.

In some examples, the link manager 1025 may be configured as or otherwise support a means for establishing a second communication link with the second UE. In some examples, the configuration transmitter 1045 may be configured as or otherwise support a means for transmitting, to the second UE, an interference measurement configuration for the second UE to perform one or more interference measurements for downlink communications from the base station to the first UE and sidelink communications to the second UE from the first UE. In some examples, the report receiver 1050 may be configured as or otherwise support a means for receiving, from the second UE, an interference measurement report including a result of the one or more interference measurements, where determining that the first UE is capable of concurrently receiving the downlink communications on the first communication link and transmitting the sidelink communications on the sidelink communication link is based on receiving the result of the one or more interference measurements.

In some examples, the interference measurement configuration includes one or more of a downlink channel state information reference signal configuration, indices associated with one or more synchronization signal blocks, a source identification associated with the first UE, or one or more sidelink transmission configuration indicator states associated with the sidelink communication link.

In some examples, the interference measurement configuration indicates the second UE to perform the one or more interference measurements using a spatial configuration quasi co-located with one or more beam directions on which the second UE is to receive sidelink communications from the first UE.

In some examples, the report receiver 1050 may be configured as or otherwise support a means for receiving, from a second base station, a message indicating a result of a one or more interference measurements performed by the second UE, determining that the first UE is capable of concurrently receiving the downlink communications on the first communication link and transmitting the sidelink communications on the sidelink communication link is based on receiving the result from the second base station.

In some examples, the power manager 1055 may be configured as or otherwise support a means for determining a transmission power for the first UE to transmit the sidelink communications on the sidelink communication link based on determining that the first UE is capable of concurrently receiving the downlink communications on the first communication link and transmitting the sidelink communications on the sidelink communication link. In some examples, the power transmitter 1060 may be configured as or otherwise support a means for transmitting, to the first UE, one or more transmission power control commands associated with the determined transmission power.

Figure 11:
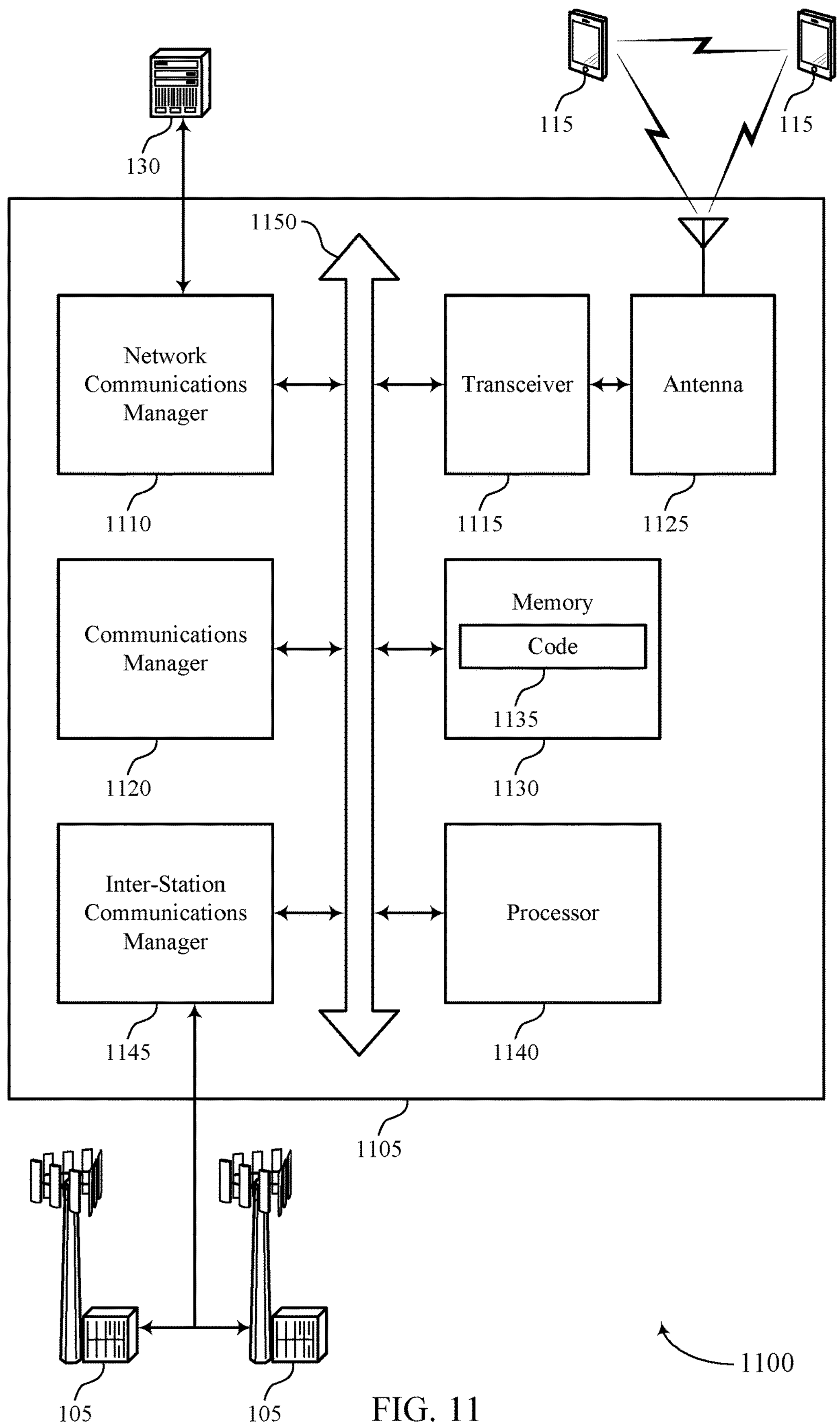
FIG. 11 shows a diagram of a system including a device that supports techniques for full-duplex operation on sidelink and downlink in wireless communications systems in accordance with aspects of the present disclosure.

FIG. 11 shows a diagram of a system 1100 including a device 1105 that supports techniques for full-duplex operation on sidelink and downlink in wireless communications systems in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for full-duplex operation on sidelink and downlink in wireless communications systems). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for establishing a first communication link with a first UE. The communications manager 1120 may be configured as or otherwise support a means for determining that the first UE is capable of concurrently receiving downlink communications on the first communication link and transmitting sidelink communications on a sidelink communication link between the first UE and a second UE. The communications manager 1120 may be configured as or otherwise support a means for transmitting a resource grant indicating a first set of resources and a second set of resources based on the determination, where the first set of resources and the second set of resources are configured for concurrently receiving a downlink message from the base station on the first communication link and transmitting a sidelink message from the first UE to the second UE on the sidelink communication link, the first set of resources at least partially overlapping with the second set of resources.

By including or configuring the communications manager 1120 in accordance with examples as described herein, the device 1105 may support techniques for full-duplex operation on downlink and sidelink communication links such that the device 1105 may exhibit an increased efficiency of communication and resource usage, a reduced latency, a reduced power consumption, or an improved coordination between devices, among other benefits.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for full-duplex operation on sidelink and downlink in wireless communications systems as described herein, or the processor 1140 and the memory 1130 may be otherwise configured to perform or support such operations.

Figure 12:
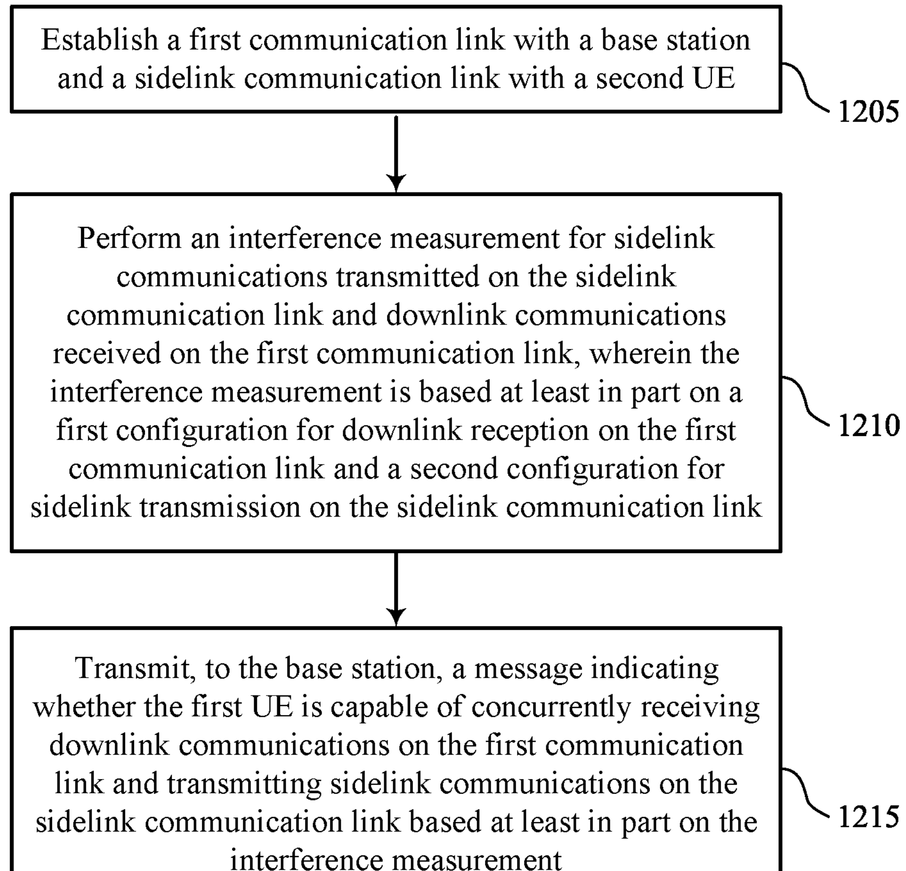
FIGS. 12 through 15 show flowcharts illustrating methods that support techniques for full-duplex operation on sidelink and downlink in wireless communications systems in accordance with aspects of the present disclosure.

FIG. 12 shows a flowchart illustrating a method 1200 that supports techniques for full-duplex operation on sidelink and downlink in wireless communications systems in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include establishing a first communication link with a base station and a sidelink communication link with a second UE. The operations of 1205 may be performed in accordance with examples as disclosed herein. In some examples, aspects of the operations of 1205 may be performed by a link component 625 as described with reference to FIG. 6.

At 1210, the method may include performing an interference measurement for sidelink communications transmitted on the sidelink communication link and downlink communications received on the first communication link, where the interference measurement is based on a first configuration for downlink reception on the first communication link and a second configuration for sidelink transmission on the sidelink communication link. The operations of 1210 may be performed in accordance with examples as disclosed herein. In some examples, aspects of the operations of 1210 may be performed by an interference component 630 as described with reference to FIG. 6.

At 1215, the method may include transmitting, to the base station, a message indicating whether the first UE is capable of concurrently receiving downlink communications on the first communication link and transmitting sidelink communications on the sidelink communication link based on the interference measurement. The operations of 1215 may be performed in accordance with examples as disclosed herein. In some examples, aspects of the operations of 1215 may be performed by an indication transmitter 635 as described with reference to FIG. 6.

Figure 13:
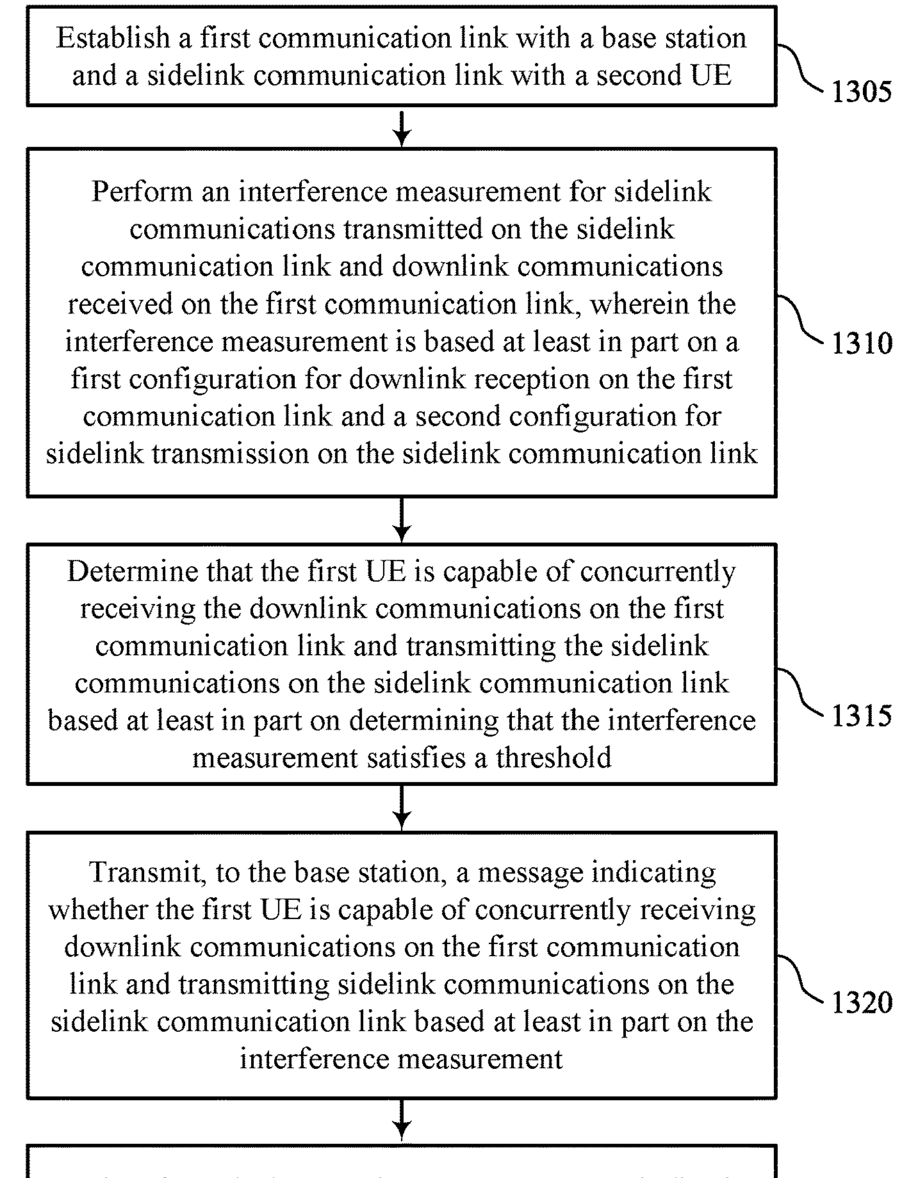

FIG. 13 shows a flowchart illustrating a method 1300 that supports techniques for full-duplex operation on sidelink and downlink in wireless communications systems in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include establishing a first communication link with a base station and a sidelink communication link with a second UE. The operations of 1305 may be performed in accordance with examples as disclosed herein. In some examples, aspects of the operations of 1305 may be performed by a link component 625 as described with reference to FIG. 6.

At 1310, the method may include performing an interference measurement for sidelink communications transmitted on the sidelink communication link and downlink communications received on the first communication link, where the interference measurement is based on a first configuration for downlink reception on the first communication link and a second configuration for sidelink transmission on the sidelink communication link. The operations of 1310 may be performed in accordance with examples as disclosed herein. In some examples, aspects of the operations of 1310 may be performed by an interference component 630 as described with reference to FIG. 6.

At 1315, the method may include determining that the first UE is capable of concurrently receiving the downlink communications on the first communication link and transmitting the sidelink communications on the sidelink communication link based on determining that the interference measurement satisfies a threshold, where transmitting the message is based on the determination. The operations of 1315 may be performed in accordance with examples as disclosed herein. In some examples, aspects of the operations of 1315 may be performed by a link component 625 as described with reference to FIG. 6.

At 1320, the method may include transmitting, to the base station, a message indicating whether the first UE is capable of concurrently receiving downlink communications on the first communication link and transmitting sidelink communications on the sidelink communication link based on the interference measurement. The operations of 1320 may be performed in accordance with examples as disclosed herein. In some examples, aspects of the operations of 1320 may be performed by an indication transmitter 635 as described with reference to FIG. 6.

At 1325, the method may include receiving, from the base station, a resource grant indicating a first set of resources and a second set of resources, where the first set of resources and the second set of resources are configured for concurrently receiving a downlink message from the base station on the first communication link and transmitting a sidelink message to the second UE on the sidelink communication link, the first set of resources at least partially overlapping with the second set of resources. The operations of 1325 may be performed in accordance with examples as disclosed herein. In some examples, aspects of the operations of 1325 may be performed by a grant receiver 650 as described with reference to FIG. 6.

Figure 14:
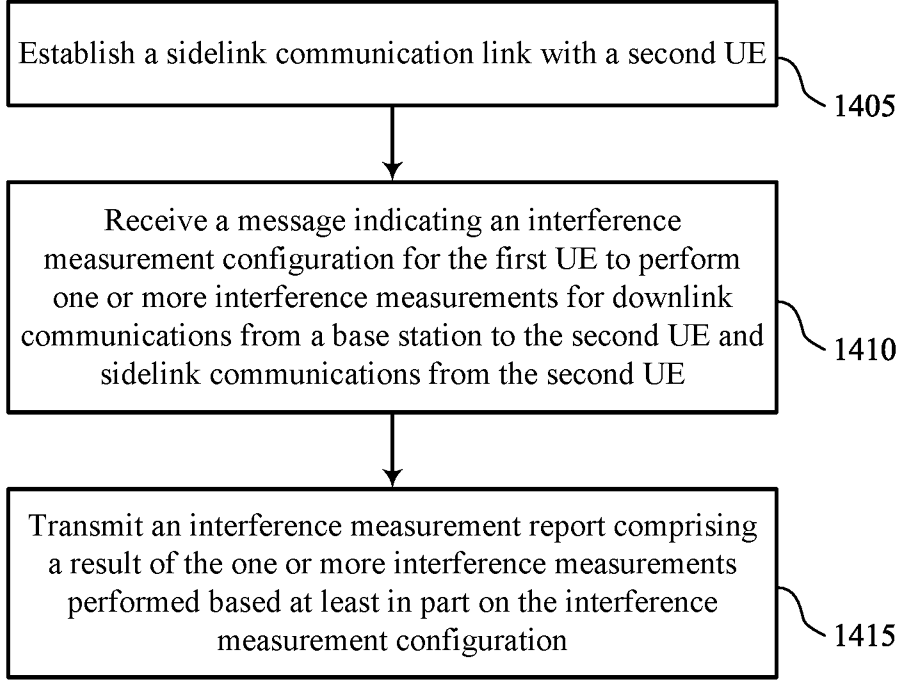

FIG. 14 shows a flowchart illustrating a method 1400 that supports techniques for full-duplex operation on sidelink and downlink in wireless communications systems in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include establishing a sidelink communication link with a second UE. The operations of 1405 may be performed in accordance with examples as disclosed herein. In some examples, aspects of the operations of 1405 may be performed by a link component 625 as described with reference to FIG. 6.

At 1410, the method may include receiving a message indicating an interference measurement configuration for the first UE to perform one or more interference measurements for downlink communications from a base station to the second UE and sidelink communications from the second UE. The operations of 1410 may be performed in accordance with examples as disclosed herein. In some examples, aspects of the operations of 1410 may be performed by a configuration receiver 640 as described with reference to FIG. 6.

At 1415, the method may include transmitting an interference measurement report including a result of the one or more interference measurements performed based on the interference measurement configuration. The operations of 1415 may be performed in accordance with examples as disclosed herein. In some examples, aspects of the operations of 1415 may be performed by a report transmitter 645 as described with reference to FIG. 6.

Figure 15:
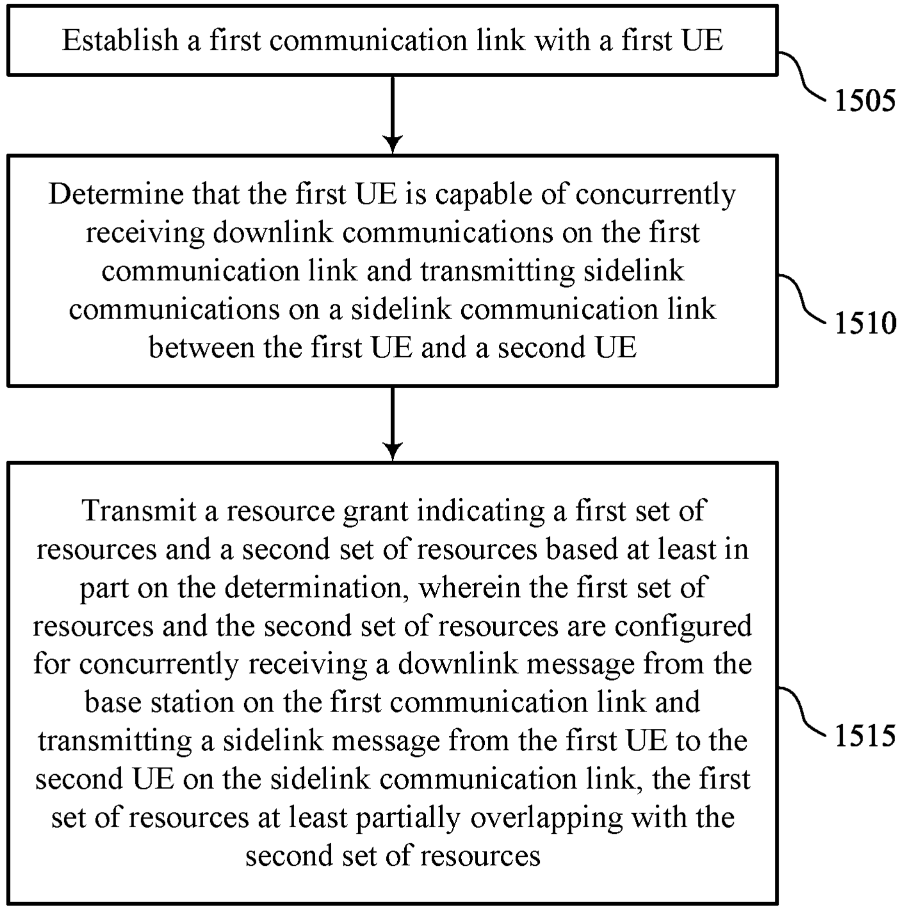

FIG. 15 shows a flowchart illustrating a method 1500 that supports techniques for full-duplex operation on sidelink and downlink in wireless communications systems in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include establishing a first communication link with a first UE. The operations of 1505 may be performed in accordance with examples as disclosed herein. In some examples, aspects of the operations of 1505 may be performed by a link manager 1025 as described with reference to FIG. 10.

At 1510, the method may include determining that the first UE is capable of concurrently receiving downlink communications on the first communication link and transmitting sidelink communications on a sidelink communication link between the first UE and a second UE. The operations of 1510 may be performed in accordance with examples as disclosed herein. In some examples, aspects of the operations of 1510 may be performed by a capability component 1030 as described with reference to FIG. 10.

At 1515, the method may include transmitting a resource grant indicating a first set of resources and a second set of resources based on the determination, where the first set of resources and the second set of resources are configured for concurrently receiving a downlink message from the base station on the first communication link and transmitting a sidelink message from the first UE to the second UE on the sidelink communication link, the first set of resources at least partially overlapping with the second set of resources. The operations of 1515 may be performed in accordance with examples as disclosed herein. In some examples, aspects of the operations of 1515 may be performed by a grant transmitter 1035 as described with reference to FIG. 10.

The following provides an overview of aspects of the present disclosure:

Aspect 1: A method for wireless communications at a first UE, comprising: establishing a first communication link with a base station and a sidelink communication link with a second UE; performing an interference measurement for sidelink communications transmitted on the sidelink communication link and downlink communications received on the first communication link, wherein the interference measurement is based at least in part on a first configuration for downlink reception on the first communication link and a second configuration for sidelink transmission on the sidelink communication link; and transmitting, to the base station, a message indicating whether the first UE is capable of concurrently receiving downlink communications on the first communication link and transmitting sidelink communications on the sidelink communication link based at least in part on the interference measurement.

Aspect 2: The method of aspect 1, further comprising: determining that the first UE is capable of concurrently receiving the downlink communications on the first communication link and transmitting the sidelink communications on the sidelink communication link based at least in part on determining that the interference measurement satisfies a threshold, wherein transmitting the message is based at least in part on the determination; and receiving, from the base station, a resource grant indicating a first set of resources and a second set of resources, wherein the first set of resources and the second set of resources are configured for concurrently receiving a downlink message from the base station on the first communication link and transmitting a sidelink message to the second UE on the sidelink communication link, the first set of resources at least partially overlapping with the second set of resources.

Aspect 3: The method of aspect 2, wherein the resource grant comprises a downlink transmission configuration indicator state the first UE is to use for concurrently monitoring a downlink control channel while transmitting the sidelink message on the sidelink communication link, receiving the downlink message is based at least in part on monitoring the downlink control channel Aspect 4: The method of aspect 1, further comprising: determining that the first UE is incapable of concurrently receiving downlink communications on the first communication link and transmitting sidelink communications on the sidelink communication link based at least in part on determining that the interference measurement fails to satisfy a threshold, wherein transmitting the message is based at least in part on the determination.

Aspect 5: The method of any of aspects 1 through 4, further comprising: transmitting, to the second UE, an interference measurement configuration for the second UE to perform one or more interference measurements between downlink communications from the base station to the first UE and sidelink communications from the first UE to the second UE; and receiving, from the second UE, an interference measurement report comprising a result of the one or more interference measurements.

Aspect 6: The method of aspect 5, wherein the interference measurement configuration comprises one or more downlink beam directions associated with the downlink communications on the first communication link, one or more beam indices associated with one or more reference signals that are quasi co-located with the one or more downlink beam directions, one or more downlink transmission configuration indicator states indicating the one or more downlink beam directions, or any combination thereof.

Aspect 7: The method of any of aspects 5 through 6, wherein receiving the interference measurement report comprising the result of the one or more interference measurements comprises: receiving an indication that the second UE is capable of concurrently receiving sidelink communications from the first UE while the first UE receives downlink communications from the base station based at least in part on the result of the one or more interference measurements.

Aspect 8: The method of any of aspects 5 through 7, further comprising: determining a transmission power for transmitting the sidelink communications on the sidelink communication link based at least in part on the result of the one or more interference measurements from the second UE; and transmitting sidelink communications on the sidelink communication link based at least in part on the transmission power.

Aspect 9: The method of aspect 8, further comprising: receiving, from the base station, an indication of a first transmission power for the sidelink communications on the sidelink communication link, wherein the transmission power is based at least in part on an adjustment of the first transmission power and the result of the one or more interference measurements.

Aspect 10: The method of any of aspects 1 through 9, wherein the message further comprises an indication of one or more of a destination identification associated with the second UE, one or more sidelink beam directions associated with the sidelink communications, or one or more beam directions the first UE is capable of using for concurrently receiving the downlink communications and transmitting the sidelink communications.

Aspect 11: The method of any of aspects 1 through 10, further comprising: receiving, from the base station, one or more transmission power control commands associated with a transmission power the first UE is to use to transmit sidelink communications on the sidelink communication link; and transmitting sidelink communications on the sidelink communication link based at least in part on receiving the one or more transmission power control commands.

Aspect 12: The method of any of aspects 1 through 11, wherein the first communication link is associated with a first transmission reception point of a set of transmission reception points at the first UE and the sidelink communication link is associated with a second transmission reception point of the set of transmission reception points at the first UE.

Aspect 13: A method for wireless communications at a first UE, comprising: establishing a sidelink communication link with a second UE; receiving a message indicating an interference measurement configuration for the first UE to perform one or more interference measurements for downlink communications from a base station to the second UE and sidelink communications from the second UE; and transmitting an interference measurement report comprising a result of the one or more interference measurements performed based at least in part on the interference measurement configuration.

Aspect 14: The method of aspect 13, wherein receiving the interference measurement configuration comprises: receiving the interference measurement configuration from the second UE, wherein the interference measurement report comprising the result of the one or more interference measurements is transmitted to the second UE.

Aspect 15: The method of aspect 14, wherein the interference measurement configuration comprises one or more downlink beam directions associated with the downlink communications on a first communication link, one or more beam indices associated with one or more reference signals that are quasi co-located with the one or more downlink beam directions, one or more downlink transmission configuration indicator states indicating the one or more downlink beam directions, or any combination thereof.

Aspect 16: The method of aspect 15, further comprising: performing the one or more interference measurements based at least in part on the interference measurement configuration, the one or more interference measurements comprising measurements of one or more reference signals using a beam direction associated with the sidelink communication link on which the first UE is to receive sidelink communications from the second UE.

Aspect 17: The method of aspect 16, further comprising: determining one or more of a reference signal received power, a signal-to-interference-plus-noise ratio, or a received signal strength indicator associated with the one or more reference signals.

Aspect 18: The method of any of aspects 14 through 17, further comprising: determining that the one or more interference measurements satisfy a threshold; and transmitting, to the second UE, an indication that the second UE is capable of concurrently receiving sidelink communications from the first UE while the first UE receives downlink communications from the base station based at least in part on the result of the one or more interference measurements, wherein transmitting the indication is based at least in part on the one or more interference measurements satisfying the threshold.

Aspect 19: The method of aspect 13, wherein receiving the interference measurement configuration comprises: establishing a first communication link with a first base station; and receiving the interference measurement configuration from the first base station, wherein the interference measurement report comprising the result of the one or more interference measurements is transmitted to the first base station.

Aspect 20: The method of aspect 19, wherein the interference measurement configuration comprises one or more of a downlink channel state information reference signal configuration, indices associated with one or more synchronization signal blocks, a source identification associated with the second UE, or one or more sidelink transmission configuration indicator states associated with the sidelink communication link with the second UE.

Aspect 21: The method of any of aspects 19 through 20, wherein the interference measurement configuration indicates that the first UE perform the one or more interference measurements using a spatial configuration quasi co-located with one or more beam directions on which the first UE is to receive sidelink communications from the second UE.

Aspect 22: A method for wireless communications at a base station, comprising: establishing a first communication link with a first UE; determining that the first UE is capable of concurrently receiving downlink communications on the first communication link and transmitting sidelink communications on a sidelink communication link between the first UE and a second UE; and transmitting a resource grant indicating a first set of resources and a second set of resources based at least in part on the determination, wherein the first set of resources and the second set of resources are configured for concurrently receiving a downlink message from the base station on the first communication link and transmitting a sidelink message from the first UE to the second UE on the sidelink communication link, the first set of resources at least partially overlapping with the second set of resources.

Aspect 23: The method of aspect 22, wherein determining that the first UE is capable of concurrently receiving the downlink communications on the first communication link and transmitting the sidelink communications on the sidelink communication link comprises: receiving, from the first UE, a message indicating a capability of the first UE to concurrently receiving the downlink communications on the first communication link and transmitting the sidelink communications on the sidelink communication link, the capability being based at least in part on an interference measurement for sidelink communications transmitted on the sidelink communication link and downlink communications received on the first communication link, wherein the determination is based at least in part on the indication of the capability.

Aspect 24: The method of aspect 23, wherein the message further comprises an indication of one or more of a destination identification associated with the second UE, one or more sidelink beam directions the first UE is to use for transmission sidelink communications to the second UE, or one or more beam directions on which the first UE is capable to receive downlink communications from the base station and concurrently transmit sidelink communications to the second UE.

Aspect 25: The method of any of aspects 22 through 24, further comprising: establishing a second communication link with the second UE; transmitting, to the second UE, an interference measurement configuration for the second UE to perform one or more interference measurements for downlink communications from the base station to the first UE and sidelink communications to the second UE from the first UE; and receiving, from the second UE, an interference measurement report comprising a result of the one or more interference measurements, wherein determining that the first UE is capable of concurrently receiving the downlink communications on the first communication link and transmitting the sidelink communications on the sidelink communication link is based at least in part on receiving the result of the one or more interference measurements.

Aspect 26: The method of aspect 25, wherein the interference measurement configuration comprises one or more of a downlink channel state information reference signal configuration, indices associated with one or more synchronization signal blocks, a source identification associated with the first UE, or one or more sidelink transmission configuration indicator states associated with the sidelink communication link.

Aspect 27: The method of any of aspects 25 through 26, wherein the interference measurement configuration indicates the second UE to perform the one or more interference measurements using a spatial configuration quasi co-located with one or more beam directions on which the second UE is to receive sidelink communications from the first UE.

Aspect 28: The method of any of aspects 22 through 27, further comprising: receiving, from a second base station, a message indicating a result of a one or more interference measurements performed by the second UE, determining that the first UE is capable of concurrently receiving the downlink communications on the first communication link and transmitting the sidelink communications on the sidelink communication link is based at least in part on receiving the result from the second base station.

Aspect 29: The method of any of aspects 22 through 28, further comprising: determining a transmission power for the first UE to transmit the sidelink communications on the sidelink communication link based at least in part on determining that the first UE is capable of concurrently receiving the downlink communications on the first communication link and transmitting the sidelink communications on the sidelink communication link; and transmitting, to the first UE, one or more transmission power control commands associated with the determined transmission power.

Aspect 30: An apparatus for wireless communications at a first UE, comprising a processor; memory coupled with the processor; and instructions stored in the memory and executable by the processor to cause the apparatus to perform a method of any of aspects 1 through 12.

Aspect 31: An apparatus for wireless communications at a first UE, comprising at least one means for performing a method of any of aspects 1 through 12.

Aspect 32: A non-transitory computer-readable medium storing code for wireless communications at a first UE, the code comprising instructions executable by a processor to perform a method of any of aspects 1 through 12.

Aspect 33: An apparatus for wireless communications at a first UE, comprising a processor; memory coupled with the processor; and instructions stored in the memory and executable by the processor to cause the apparatus to perform a method of any of aspects 13 through 21.

Aspect 34: An apparatus for wireless communications at a first UE, comprising at least one means for performing a method of any of aspects 13 through 21.

Aspect 35: A non-transitory computer-readable medium storing code for wireless communications at a first UE, the code comprising instructions executable by a processor to perform a method of any of aspects 13 through 21.

Aspect 36: An apparatus for wireless communications at a base station, comprising a processor; memory coupled with the processor; and instructions stored in the memory and executable by the processor to cause the apparatus to perform a method of any of aspects 22 through 29.

Aspect 37: An apparatus for wireless communications at a base station, comprising at least one means for performing a method of any of aspects 22 through 29.

Aspect 38: A non-transitory computer-readable medium storing code for wireless communications at a base station, the code comprising instructions executable by a processor to perform a method of any of aspects 22 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:

establishing a first communication link with a base station and a sidelink communication link with a second UE;

performing an interference measurement for sidelink communications transmitted on the sidelink communication link and downlink communications received on the first communication link, wherein the sidelink communications are performed concurrently with the downlink communications and wherein the interference measurement is based at least in part on a first configuration for downlink reception on the first communication link and a second configuration for sidelink transmission on the sidelink communication link; and transmitting, to the base station, a message indicating whether the first UE is capable of concurrently receiving downlink communications on the first communication link and transmitting sidelink communications on the sidelink communication link based at least in part on the interference measurement.

2. The method of claim 1, further comprising:

determining that the first UE is capable of concurrently receiving the downlink communications on the first communication link and transmitting the sidelink communications on the sidelink communication link based at least in part on determining that the interference measurement satisfies a threshold, wherein transmitting the message is based at least in part on the determination; and receiving, from the base station, a resource grant indicating a first set of resources and a second set of resources, wherein the first set of resources and the second set of resources are configured for concurrently receiving a downlink message from the base station on the first communication link and transmitting a sidelink message to the second UE on the sidelink communication link, the first set of resources at least partially overlapping with the second set of resources.

3. The method of claim 2, wherein:

the resource grant comprises a downlink transmission configuration indicator state the first UE is to use for concurrently monitoring a downlink control channel while transmitting the sidelink message on the sidelink communication link, receiving the downlink message is based at least in part on monitoring the downlink control channel.

4. The method of claim 1, further comprising:

determining that the first UE is incapable of concurrently receiving downlink communications on the first communication link and transmitting sidelink communications on the sidelink communication link based at least in part on determining that the interference measurement fails to satisfy a threshold, wherein transmitting the message is based at least in part on the determination.

5. The method of claim 1, further comprising:

transmitting, to the second UE, an interference measurement configuration for the second UE to perform one or more interference measurements between downlink communications from the base station to the first UE and sidelink communications from the first UE to the second UE; and receiving, from the second UE, an interference measurement report comprising a result of the one or more interference measurements.

6. The method of claim 5, wherein the interference measurement configuration comprises one or more downlink beam directions associated with the downlink communications on the first communication link, one or more beam indices associated with one or more reference signals that are quasi co-located with the one or more downlink beam directions, one or more downlink transmission configuration indicator states indicating the one or more downlink beam directions, or any combination thereof.

7. The method of claim 5, wherein receiving the interference measurement report comprising the result of the one or more interference measurements comprises:

receiving an indication that the second UE is capable of concurrently receiving sidelink communications from the first UE while the first UE receives downlink communications from the base station based at least in part on the result of the one or more interference measurements.

8. The method of claim 5, further comprising:

determining a transmission power for transmitting the sidelink communications on the sidelink communication link based at least in part on the result of the one or more interference measurements from the second UE; and transmitting sidelink communications on the sidelink communication link based at least in part on the transmission power.

9. The method of claim 8, further comprising:

receiving, from the base station, an indication of a first transmission power for the sidelink communications on the sidelink communication link, wherein the transmission power is based at least in part on an adjustment of the first transmission power and the result of the one or more interference measurements.

10. The method of claim 1, wherein the message further comprises an indication of one or more of a destination identification associated with the second UE, one or more sidelink beam directions associated with the sidelink communications, or one or more beam directions the first UE is capable of using for concurrently receiving the downlink communications and transmitting the sidelink communications.

11. The method of claim 1, further comprising:

receiving, from the base station, one or more transmission power control commands associated with a transmission power the first UE is to use to transmit sidelink communications on the sidelink communication link; and transmitting sidelink communications on the sidelink communication link based at least in part on receiving the one or more transmission power control commands.

12. The method of claim 1, wherein the first communication link is associated with a first transmission reception point of a set of transmission reception points at the first UE and the sidelink communication link is associated with a second transmission reception point of the set of transmission reception points at the first UE.

13. An apparatus for wireless communications at a first user equipment (UE), comprising:

a processor;

memory coupled with the processor; and instructions stored in the memory and executable by the processor to cause the apparatus to:

establish a first communication link with a base station and a sidelink communication link with a second UE;

perform an interference measurement for sidelink communications transmitted on the sidelink communication link and downlink communications received on the first communication link, wherein the sidelink communications are performed concurrently with the downlink communications and wherein the interference measurement is based at least in part on a first configuration for downlink reception on the first communication link and a second configuration for sidelink transmission on the sidelink communication link; and transmit, to the base station, a message indicating whether the first UE is capable of concurrently receiving downlink communications on the first communication link and transmitting sidelink communications on the sidelink communication link based at least in part on the interference measurement.

14. The apparatus of claim 13, wherein the instructions further cause the apparatus to:

determine that the first UE is capable of concurrently receiving the downlink communications on the first communication link and transmitting the sidelink communications on the sidelink communication link based at least in part on determining that the interference measurement satisfies a threshold, wherein transmitting the message is based at least in part on the determination; and receive, from the base station, a resource grant indicating a first set of resources and a second set of resources, wherein the first set of resources and the second set of resources are configured for concurrently receiving a downlink message from the base station on the first communication link and transmitting a sidelink message to the second UE on the sidelink communication link, the first set of resources at least partially overlapping with the second set of resources.

15. The apparatus of claim 14, wherein:

the resource grant comprises a downlink transmission configuration indicator state the first UE is to use for concurrently monitoring a downlink control channel while transmitting the sidelink message on the sidelink communication link, and receiving the downlink message is based at least in part on monitoring the downlink control channel.

16. The apparatus of claim 13, wherein the instructions further cause the apparatus to:

determine that the first UE is incapable of concurrently receiving downlink communications on the first communication link and transmitting sidelink communications on the sidelink communication link based at least in part on determining that the interference measurement fails to satisfy a threshold, wherein transmitting the message is based at least in part on the determination.

17. The apparatus of claim 13, wherein the instructions further cause the apparatus to:

transmit, to the second UE, an interference measurement configuration for the second UE to perform one or more interference measurements between downlink communications from the base station to the first UE and sidelink communications from the first UE to the second UE; and receive, from the second UE, an interference measurement report comprising a result of the one or more interference measurements.

18. The apparatus of claim 17, wherein the interference measurement configuration comprises one or more downlink beam directions associated with the downlink communications on the first communication link, one or more beam indices associated with one or more reference signals that are quasi co-located with the one or more downlink beam directions, one or more downlink transmission configuration indicator states indicating the one or more downlink beam directions, or any combination thereof.

19. The apparatus of claim 17, wherein to receive the interference measurement report comprising the result of the one or more interference measurements, the instructions cause the apparatus to:

receive an indication that the second UE is capable of concurrently receiving sidelink communications from the first UE while the first UE receives downlink communications from the base station based at least in part on the result of the one or more interference measurements.

20. The apparatus of claim 17, the instructions further direction the apparatus to:

determine a transmission power for transmitting the sidelink communications on the sidelink communication link based at least in part on the result of the one or more interference measurements from the second UE; and transmit sidelink communications on the sidelink communication link based at least in part on the transmission power.

21. The apparatus of claim 20, the instructions further direction the apparatus to:

receive, from the base station, an indication of a first transmission power for the sidelink communications on the sidelink communication link, wherein the transmission power is based at least in part on an adjustment of the first transmission power and the result of the one or more interference measurements.

22. The apparatus of claim 13, wherein the message further comprises an indication of one or more of a destination identification associated with the second UE, one or more sidelink beam directions associated with the sidelink communications, or one or more beam directions the first UE is capable of using for concurrently receiving the downlink communications and transmitting the sidelink communications.

23. The apparatus of claim 13, wherein the instructions further cause the apparatus to:

receive, from the base station, one or more transmission power control commands associated with a transmission power the first UE is to use to transmit sidelink communications on the sidelink communication link; and transmit sidelink communications on the sidelink communication link based at least in part on receiving the one or more transmission power control commands.

24. The apparatus of claim 13, wherein the first communication link is associated with a first transmission reception point of a set of transmission reception points at the first UE and the sidelink communication link is associated with a second transmission reception point of the set of transmission reception points at the first UE.

* * * * *